United States Patent
Zeng et al.

(10) Patent No.: US 11,184,951 B2
(45) Date of Patent: Nov. 23, 2021

(54) SIGNAL TRANSMISSION METHOD AND TERMINAL

(71) Applicant: Huawei Technologies Co., Ltd., Shenzhen (CN)

(72) Inventors: Yongbo Zeng, Beijing (CN); Yu Cai, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/325,094

(22) PCT Filed: Aug. 12, 2016

(86) PCT No.: PCT/CN2016/095065
§ 371 (c)(1),
(2) Date: Feb. 12, 2019

(87) PCT Pub. No.: WO2018/027996
PCT Pub. Date: Feb. 15, 2018

(65) Prior Publication Data
US 2019/0357304 A1 Nov. 21, 2019

(51) Int. Cl.
*H04W 72/08* (2009.01)
*H04W 88/04* (2009.01)
(Continued)

(52) U.S. Cl.
CPC ......... *H04W 88/04* (2013.01); *H04L 5/0051* (2013.01); *H04L 5/10* (2013.01); *H04W 4/40* (2018.02);
(Continued)

(58) Field of Classification Search
CPC ... H04W 88/04; H04W 80/02; H04W 72/048; H04W 4/40; H04L 5/10; H04L 5/0051; H04L 5/0053; H04L 5/0048
See application file for complete search history.

(56) References Cited

U.S. PATENT DOCUMENTS

| | | | | |
|---|---|---|---|---|
| 5,844,900 A | * | 12/1998 | Hong | ................. H04W 74/006 370/342 |
| 2010/0322213 A1 | | 12/2010 | Liu et al. | |

(Continued)

FOREIGN PATENT DOCUMENTS

| | | |
|---|---|---|
| CN | 102651777 A | 8/2012 |
| CN | 104602179 A | 5/2015 |

(Continued)

OTHER PUBLICATIONS

Machine Translation and Abstract of Chinese Publication No. CN103262632, Aug. 21, 2013, 130 pages.
(Continued)

*Primary Examiner* — Sithu Ko
*Assistant Examiner* — Malick A Sohrab
(74) *Attorney, Agent, or Firm* — Conley Rose, P.C.

(57) ABSTRACT

A signal transmission method and a terminal, where a first terminal sets first information indicating a terminal type of the first terminal, and sends a signal including, the first information to a second terminal such that the second terminal identifies the terminal type of the first terminal based on the first information. The first information is set, and the signal including the first information is sent to the second terminal such that the second terminal identifies the terminal type of the first terminal based on the first information and processes the processed signal based on the terminal type of the first terminal to prevent, by distinguishing types of terminals, signal interference from being caused between different terminals.

20 Claims, 7 Drawing Sheets

(51) Int. Cl.
*H04W 4/40* (2018.01)
*H04L 5/00* (2006.01)
*H04L 5/10* (2006.01)
*H04W 72/04* (2009.01)
*H04W 80/02* (2009.01)

(52) U.S. Cl.
CPC ......... *H04W 72/048* (2013.01); *H04W 80/02* (2013.01)

(56) References Cited

U.S. PATENT DOCUMENTS

| | | | |
|---|---|---|---|
| 2012/0329385 A1* | 12/2012 | Chang | H04W 8/005 455/39 |
| 2015/0078297 A1 | 3/2015 | Zheng | |
| 2015/0349874 A1* | 12/2015 | Bhargava | H04L 5/0057 370/315 |
| 2016/0050667 A1* | 2/2016 | Papasakellariou | H04L 1/1822 370/329 |
| 2017/0094495 A1 | 3/2017 | Ke et al. | |
| 2017/0367100 A1* | 12/2017 | Sorrentino | H04W 72/1215 |
| 2018/0234977 A1* | 8/2018 | Yasukawa | H04W 76/23 |
| 2018/0262887 A1* | 9/2018 | Futaki | H04W 8/24 |
| 2019/0090250 A1* | 3/2019 | Lee | H04W 72/0446 |
| 2019/0116567 A1* | 4/2019 | Zhang | H04L 5/005 |
| 2019/0132832 A1* | 5/2019 | Uchiyama | H04W 4/40 |
| 2019/0207732 A1* | 7/2019 | Shin | H04J 13/004 |
| 2019/0373622 A1* | 12/2019 | Li | H04W 72/1231 |

FOREIGN PATENT DOCUMENTS

| | | |
|---|---|---|
| CN | 104918233 A | 9/2015 |
| CN | 105517168 A | 4/2016 |
| EP | 3409057 A2 | 12/2018 |
| GN | 103262632 A | 8/2013 |
| WO | 2017196159 A2 | 11/2017 |

OTHER PUBLICATIONS

Foreign Communication From A Counterpart Application, Chinese Application No. 201680086984.7, Chinese Office Action dated Dec. 26, 2019, 7 pages.

3GPP TR 36.885 V2.0.0, 3rd Generation Partnership Project; Technical Specification Group Radio Access Network; Study on LTE-based V2X Services; (Release 14), Jun. 2016, 220 pages.

LG Electronics, "3GPP TSG-RAN Meeting #72, RP-160790, TR 36.885 v2.0.0 on Study on LTE-based V2X Services, for approval", Busan, Korea, Jun. 13-16, 2016, 1 page.

ZTE, 3GPP TSG RAN WG1 Meeting #85, R1-164972, "Discussion on V2P design aspects", Nanjing, China May 23-27, 2016, 3 pages.

Machine Translation and Abstract of Chinese Publication No. CN102651777, Aug. 29, 2012, 20 pages.

Machine Translation and Abstract of Chinese Publication No. CN104602179, May 65, 2015, 23 pages.

Machine Translation and Abstract of Chinese Publication No. CN105517168, Apr. 20, 2016, 33 pages.

Foreign Communication From A Counterpart Application, PCT Application No. PCT/CN2016/095065, English Translation of International Search Report dated May 3, 2017, 2 pages.

Foreign Communication From A Counterpart Application, PCT Application No. PCT/CN2016/095065, English Translation of Written Opinion dated May 3, 2017, 4 pages.

Ericsson, "Sidelink Resource Allocation in V2X," R2-164105, 3GPP TSG-RAN WG2 #94, Nanjing, P.R. China, May 23-27, 2016, 5 pages.

Ericsson, "Sidelink Resource Allocation in V2X," R2-161566, 3GPP TSG-RAN WG2 #93, Malta, Feb. 15-19, 2016, 10 pages.

Foreign Communication From A Counterpart Application, European Application No. 16912451.8, Extended European Search Report dated May 29, 2019, 14 pages.

\* cited by examiner

SIGNAL TRANSMISSION METHOD AND TERMINAL

CROSS-REFERENCE TO RELATED APPLICATIONS

This application is a U.S. National Stage of International Patent Application No. PCT/CN2016/095065 filed on Aug. 12, 2016, which is hereby incoporated by reference in its entirety.

TECHNICAL FIELD

Embodiments of the present invention relate to the field of communications technologies, and in particular, to a signal transmission method and a terminal.

BACKGROUND

With development of communications technologies, various device to device (Device to Device, D2D) communications are widely applied, for example, applied to vehicle-to-everything (Vehicle-to-Everything, V2X) communication. The V2X communication includes vehicle to vehicle (Vehicle to Vehicle, V2V) communication, vehicle-to-infrastructure (Vehicle-to-Infrastructure, V2I) communication, vehicle-to-pedestrian (Vehicle-to-Pedestrian, V2P) communication, and the like. V2P includes a V2P scenario and a P2V scenario. In the P2V scenario, pedestrian user equipment (Pedestrian User Equipment, PUE) sends a signal, and vehicle user equipment (Vehicle User Equipment, VUE) receives the signal; and in the V2P scenario, VUE sends a signal, and PUE receives the signal.

In a V2P communication process (which includes a V2P scenario and a P2V scenario), a resource pool is assigned or preconfigured by a network side device, and VUE and PUE autonomously select resources from the resource pool to perform V2P communication or P2V communication. Currently, in V2V communication, all user equipments (User Equipment, UE) select, from a resource pool by using a same mechanism, time frequency resources used for signal transmission. In a case of using this mechanism in V2P communication, when VUE and PUE send signals by selecting a same time frequency resource, for example, send signals in a same subframe or even on a same resource block, because transmit power of the VUE is relatively large, and transmit power of the PUE is relatively small, a signal sent by the VUE causes interference to a signal sent by the PUE.

SUMMARY

Embodiments of the present invention provide a signal transmission method and a terminal, to prevent, by distinguishing types of terminals, signal interference from being caused between different terminals.

According to a first aspect, an embodiment of the present invention provides a signal transmission method, and the method is described from the perspective of a first terminal, that is, a transmit end. In the method, the first terminal sets first information indicating a terminal type of the first terminal, and sends a signal including the first information to a second terminal, so that the second terminal identifies the terminal type of the first terminal based on the first information.

In the foregoing method, the first information is set, and the signal including the first information is sent to the second terminal, so that the second terminal identifies the terminal type of the first terminal based on the first information and processes the processed signal based on the terminal type of the first terminal, to prevent, by distinguishing types of terminals, signal interference from being caused between different terminals.

In a feasible implementation, the first information is specifically a type field of control information, and the first terminal sets the type field based on the terminal type of the first terminal, and then sends a signal including the control information.

In the foregoing manner, the type field indicating the terminal type is added to the control information, so that the first terminal sets the type field based on the terminal type of the first terminal, and sends the signal including the control information to the second terminal, to explicitly indicate the terminal type by using the control information.

In a feasible implementation, the first information is specifically a signal period field of control information; and the first terminal sets the signal period field based on the terminal type of the first terminal, and then sends a signal including the control information, In the foregoing manner, the terminal type is implicitly indicated by using the signal period field in the control information.

In a feasible implementation, the first information is specifically a transmit power field of control information; and the first terminal sets the transmit power field based on the terminal type of the first terminal, and then sends a signal including the control information.

In the foregoing manner, the terminal type is implicitly indicated by using the transmit power field in the control information, In a feasible implementation, the first information is specifically a priority field of control information; and the first terminal sets the priority field based on the terminal type of the first terminal, and then sends a signal including the control information.

In the foregoing manner, the terminal type is implicitly indicated by using the priority field in the control information.

In a feasible implementation, the first information is specifically a sequence number of a demodulation reference signal DMRS; and the first terminal sets the sequence number based on the terminal type of the first terminal, and then sends a signal including the DMRS corresponding to the sequence number.

In the foregoing manner, the DMRS carries the terminal type, and sequence numbers of DMRSs of terminals of different terminal types are different, to implicitly indicate the terminal type by using the DMRS.

In a feasible implementation, the first information is specifically a mask of a demodulation reference signal DMRS; and the first terminal sets the mask based on the terminal type of the first terminal, and then sends a signal including the DMRS processed by using the mask.

In the foregoing manner, the DMRS carries the terminal type, and DMRSs of terminals of different terminal types are obtained by processing a DMRS of a same sequence number by using different masks, to implicitly indicate the terminal type by using the DMRS.

In a feasible implementation, the first information is specifically an information element IE of Media Access Control MAC information; and the first terminal sets the IE based on the terminal type of the first terminal, and then sends a signal including the MAC information.

In the foregoing manner, the MAC information carries the terminal type, and values of IEs of MAC information headers of terminals of different terminal types are different, to explicitly indicate the terminal type by using the MAC information.

In a feasible implementation, before sending the signal including the first information, the first terminal further determines a transmission resource based on the terminal type of the first terminal, and then sends, by using the transmission resource, the signal including the first information.

In the foregoing manner, the first terminal selects the transmission resource based on the terminal type of the first terminal, and transmission resources selected by terminals of different terminal types are different, to avoid signal interference between the terminals of the different terminal types.

In a feasible implementation, when the terminal type indicates that the first terminal is pedestrian user equipment PUE, the transmission resource includes a reusable resource, and the reusable resource is a resource, of another PUE, reused by the first terminal.

When the terminal type indicates that the first terminal is vehicle user equipment VUE, the first terminal determines whether the first terminal can reuse a resource of PUE, and if the first terminal can reuse the resource of the PUE, the transmission resource includes a reusable resource, and the reusable resource is the resource, of the PUE, reused by the first terminal.

In the foregoing manner, different behaviors are defined for the terminals of the different terminal types. To be specific, the PUE can reuse a transmission resource of another PUE, and the VUE cannot reuse a transmission resource of the PUE or can reuse a transmission resource of the PUE only when a particular condition is satisfied, to maximally use a transmission resource while avoiding interference of a signal of the VUE to a signal of the PUE.

In a feasible implementation, the first terminal determines whether the first terminal can reuse the resource of the PUE in at least one of the following manners: the first terminal determines whether energy of a signal received by the first terminal is less than a first threshold, and if the energy of the signal received by the first terminal is less than the first threshold, determines that the first terminal can reuse the resource of the PUE; the first terminal determines whether power of a signal received by the first terminal is less than a second threshold, and if the power of the signal received by the first terminal is less than the second threshold, determines that the first terminal can reuse the resource of the PUE; and the first terminal determines whether power of a signal transmitted by the first terminal is less than a third threshold, and if the power of the signal transmitted by the first terminal is less than the third threshold, determines that the first terminal can reuse the resource of the PUE.

In the foregoing manner, when the first terminal is VUE, the VUE determines, based on a situation of receiving a signal by the VUE and a situation of transmitting a signal by the VUE, whether the VUE reuses a resource of PUE.

In a feasible implementation, the determining, by the first terminal, whether the first terminal can reuse a resource of PUE includes: determining, by the first terminal based on configuration information or preconfiguration information sent by a network side device, whether the first terminal can reuse the resource of the PUE.

In the foregoing manner, when the first terminal falls within a coverage area of the network side device, the network side device preconfigures whether the first terminal can reuse the resource of the PUE; and when the second terminal falls beyond the coverage area of the network side device, the network side device preconfigures whether the first terminal can reuse the resource of the PUE.

According to a second aspect, an embodiment of the present invention provides a signal transmission method, and the method is described from the perspective of a second terminal, that is, a receive end. In the method, the second terminal receives a signal that includes first information and that is sent by a first terminal, where the first information indicates a terminal type of the first terminal; and identifies the terminal type of the first terminal based on the first information.

In the foregoing method, the first terminal sets the first information, and sends the signal including the first information to the second terminal, so that the second terminal identifies the terminal type of the first terminal based on the first information and processes the processed signal based on the terminal type of the first terminal, to prevent, by distinguishing types of terminals, signal interference from being caused between different terminals, In a feasible implementation, the first information is specifically a type field of control information;

the receiving, by a second terminal, a signal that includes first information and that is sent by a first terminal includes:

receiving, by the second terminal, a signal including the control information, where the signal including the control information is obtained by setting, by the first terminal, the type field; and the identifying, by the second terminal, the terminal type of the first terminal based on the first information includes:

identifying, by the second terminal, the terminal type of the first terminal based on the type field.

In a feasible implementation, the first information is specifically a signal period field of control information;

the receiving, by a second terminal, a signal that includes first information and that is sent by a first terminal includes:

receiving, by the second terminal, a signal including the control information, where the signal including the control information is obtained by setting, by the first terminal, the signal period field; and the identifying, by the second terminal, the terminal type of the first terminal based on the first information includes:

identifying, by the second terminal, the terminal type of the first terminal based on the signal period field.

In a feasible implementation, the first information is specifically a transmit power field of control information;

the receiving, by a second terminal, a signal that includes first information and that is sent by a first terminal includes:

receiving, by the second terminal, a signal including the control information, where the signal including the control information is obtained by setting, by the first terminal, the transmit power field; and the identifying, by the second terminal, the terminal type of the first terminal based on the first information includes:

identifying, by the second terminal, the terminal type of the first terminal based on the transmit power field.

In a feasible implementation, the first information is specifically a priority field of control information;

the receiving, by a second terminal, a signal that includes first information and that is sent by a first terminal includes:

receiving, by the second terminal, a signal including the control information, where the signal including the control information is obtained by setting, by the first terminal, the priority field; and the identifying, by the second terminal, the terminal type of the first terminal based on the first information includes:

identifying, by the second terminal, the terminal type of the first terminal based on the priority field.

In a feasible implementation, the first information is specifically a sequence number of a demodulation reference signal DMRS;

the receiving, by a second terminal, a signal that includes first information and that is sent by a first terminal includes:

receiving, by the second terminal, a signal including the DMRAS corresponding to the sequence number, where the sequence number is set by the first terminal based on the terminal type of the first terminal; and the identifying, by the second terminal, the terminal type of the first terminal based on the first information includes:

identifying, by the second terminal, the terminal type of the first terminal based on the sequence number.

In a feasible implementation, the first information is specifically a mask of a demodulation reference signal DMRS;

the receiving, by a second terminal, a signal that includes first information and that is sent by a first terminal includes:

receiving, by the second terminal, a signal including the DMRS processed by using the mask, where the mask is set by the first terminal based on the terminal type of the first terminal; and the identifying, by the second terminal, the terminal type of the first terminal based on the first information includes:

identifying, by the second terminal, the terminal type of the first terminal based on the mask.

In a feasible implementation, the first information is specifically an information element IE of Media Access Control MAC information;

the receiving, by a second terminal, a signal that includes first information and that is sent by a first terminal includes:

receiving, by the second terminal, a signal including the MAC, where the signal including the MAC is obtained by setting, by the first terminal, the IE; and the identifying, by the second terminal, the terminal type of the first terminal based on the first information includes:

identifying, by the second terminal, the terminal type of the first terminal based on the IE.

In a feasible implementation, the receiving, by a second terminal, a signal that includes first information and that is sent by a first terminal includes:

receiving, by the second terminal by using a transmission resource, the signal that includes the first information and that is sent by the first terminal, where the transmission resource is determined by the first terminal based on the terminal type of the first terminal.

In a feasible implementation, when the terminal type indicates that the first terminal is pedestrian user equipment PUE, the transmission resource includes a reusable resource, and the reusable resource is a resource, of another PUE, reused by the first terminal.

In a feasible implementation, when the terminal type indicates that the first terminal is vehicle user equipment VUE, if the first terminal determines that the first terminal reuses a resource of PUE, the transmission resource includes a reusable resource, and the reusable resource is the resource, of the PUE, reused by the first terminal.

According to a third aspect, an embodiment of the present invention provides a transmission resource selection method, and the method is described from the perspective of a third terminal, that is, a transmit end. In the method, after selecting a first transmission resource based on a terminal type and/or a service type of the third terminal, the third terminal sends a first signal to a fourth terminal by using the first transmission resource, and the fourth terminal processes the first In the foregoing method, the third terminal selects the first transmission resource based on the terminal type and/or the service type of the third terminal, so that transmission resources selected by terminals of different terminal types are different, to prevent interference from being caused between signals sent by the terminals of the different terminal types; and similarly, the third terminal may alternatively select corresponding resources based on different service types, to prevent interference from being caused between services of the different service types.

In a feasible implementation, the third terminal is vehicle user equipment VUE, and the method further includes:

receiving, by the third terminal, a second signal sent by the fourth terminal by using a second transmission resource; and the selecting, by a third terminal, a first transmission resource based on a terminal type and/or a service type of the third terminal includes:

selecting, by the third terminal, a first resource not conflicting with the second transmission resource based on the terminal type and/or the service type of the third terminal.

In a feasible implementation, the third terminal is pedestrian user equipment PUE, and the determining, by the third terminal, a transmission resource based on the terminal type of the third terminal includes:

selecting, by the third terminal, an SCI resource at a preset location;

selecting, by the third terminal, an SCI resource and a data resource that satisfy a preset mapping relationship; or selecting, by the third terminal, an SCI resource in a preset SCI resource pool and a data resource in a preset data resource pool.

According to a fourth aspect, an embodiment of the present invention provides a transmission resource selection method, and the method is described from the perspective of a fourth terminal, that is, a receive end. In the method, the fourth terminal receives a first signal sent by a third terminal by using a first transmission resource and processes the first signal, and because the first transmission resource is selected by the third terminal based on a terminal type and/or a service type of the third terminal, transmission resources selected by terminals of different terminal types are different, to prevent interference from being caused between signals sent by the terminals of the different terminal types; and similarly, the fourth terminal may alternatively select corresponding resources based on different service types, to prevent interference from being caused between services of the different service types.

In a feasible implementation, the foregoing method further includes:

determining, by the fourth terminal, a terminal type of the third terminal based on the transmission resource.

In a feasible implementation, the determining, by the fourth terminal, a terminal type of the third terminal based on the transmission resource includes:

determining, by the fourth terminal, whether an SCI resource is located at a preset location; and if the fourth terminal determines that the SCI resource is located at the preset location, determining that the third terminal is PUE; otherwise, determining that the third terminal is VUE.

In a feasible implementation, the determining, by the fourth terminal, a terminal type of the third terminal based on the transmission resource includes:

determining, by the fourth terminal, whether an SCI resource and a data resource satisfy a preset mapping relationship; and if the fourth terminal determines that the SCI resource and the data resource satisfy the preset mapping relationship, determining that the third terminal is PUE; otherwise, determining that the third terminal is VUE.

In a feasible implementation, the determining, by the fourth terminal, a terminal type of the third terminal based on the transmission resource includes:

determining, by the fourth terminal, whether an SCI resource is located in a preset SCI resource pool and whether a data resource is located in a preset data resource pool; and if the fourth terminal determines that the SCI resource is located in the preset SCI resource pool and the data resource is located in the preset data resource pool, determining that the third terminal is PUE; otherwise, determining that the third terminal is VUE.

According to a fifth aspect, an embodiment of the present invention provides a terminal, where the terminal is a first terminal, and the first terminal includes:

a processing module, configured to set first information, where the first information indicates a terminal type of the first terminal; and a sending module, configured to send a signal including the first information to a second terminal.

In a feasible implementation, the first information is specifically a type field of control information;

the processing module is specifically configured to set the type field based on the terminal type of the first terminal; and the sending module is specifically configured to send a signal including the control information.

In a feasible implementation, the first information is specifically a signal period field of control information;

the processing module is specifically configured to set the signal period field based on the terminal type of the first terminal; and the sending module is specifically configured to send a signal including the control information.

In a feasible implementation, the first information is specifically a transmit power field of control information;

the processing module is specifically configured to set the transmit power field based on the terminal type of the first terminal; and the sending module is specifically configured to send a signal including the control information.

In a feasible implementation, the first information is specifically a priority field of control information;

the processing module is specifically configured to set the priority field based on the terminal type of the first terminal; and the sending module is specifically configured to send a signal including the control information.

In a feasible implementation, the first information is specifically a sequence number of a demodulation reference signal DMRS;

the processing module is specifically configured to set the sequence number based on the terminal type of the first terminal; and the sending module is specifically configured to send a signal including the DMRS corresponding to the sequence number.

In a feasible implementation, the first information is specifically a mask of a demodulation reference signal DMRS;

the processing module is specifically configured to set the mask of the RS based on the terminal type of the first terminal; and the sending module is specifically configured to send a signal including the DMRS processed by using the mask.

In a feasible implementation, the first information is specifically an information element IE of Media Access Control MAC information;

the processing module is specifically configured to set the IE based on the terminal type of the first terminal; and the sending module is specifically configured to send a signal including the MAC information.

In a feasible implementation, the processing module is further configured to: before the sending module sends the signal including the first information, determine a transmission resource based on the terminal type of the first terminal; and the sending module is specifically configured to send, by using the transmission resource, the signal including the first information.

In a feasible implementation, when the terminal type indicates that the first terminal is pedestrian user equipment PUE, the transmission resource includes a reusable resource, and the reusable resource is a resource, of another PUE, reused by the first terminal.

In a feasible implementation, the processing module is further configured to: when the terminal type indicates that the first terminal is vehicle user equipment VUE, determine whether the first terminal can reuse a resource of PUE, and if the first terminal can reuse the resource of the PUE, the transmission resource includes a reusable resource, and the reusable resource is the resource, of the PUE, reused by the first terminal.

In a feasible implementation, the processing module specifically determines whether the first terminal can reuse the resource of the PUE in at least one of the following manners:

determining whether energy of a signal received by the first terminal is less than a first threshold, and if the energy of the signal received by the first terminal is less than the first threshold, determining that the first terminal can reuse the resource of the PUE;

determining whether power of a signal received by the first terminal is less than a second threshold, and if the power of the signal received by the first terminal is less than the second threshold, determining that the first terminal can reuse the resource of the PUE; and determining whether power of a signal transmitted by the first terminal is less than a third threshold, and if the power of the signal transmitted by the first terminal is less than the third threshold, determining that the first terminal can reuse the resource of the PUE.

In a feasible implementation, the processing module is specifically configured to determine, based on configuration information or preconfiguration information sent by a network side device, whether the first terminal can reuse the resource of the PUE.

According to a sixth aspect, an embodiment of the present invention provides a terminal, where the terminal is a second terminal, and the second terminal includes:

a receiving module, configured to receive a signal that includes first information and that is sent by a first terminal, where the first information indicates a terminal type of the first terminal; and a processing module, configured to identify the terminal type of the first terminal based on the first information.

In a feasible implementation, the first information is specifically a type field of control information;

the receiving module is specifically configured to receive a signal including the control information, where the signal including the control information is obtained by setting, by the first terminal, the type field; and the processing module is specifically configured to identify the terminal type of the first terminal based on the type field.

In a feasible implementation, the first information is specifically a signal period field of control information;

the receiving module is specifically configured to receive a signal including the control information, where the signal including the control information is obtained by setting, by the first terminal, the signal period field; and the processing module is specifically configured to identify the terminal type of the first terminal based on the signal period field.

In a feasible implementation, the first information is specifically a transmit power field of control information;

the receiving module is specifically configured to receive a signal including the control information, where the signal including the control information is obtained by setting, by the first terminal, the transmit power field; and the processing module is specifically configured to identify the terminal type of the first terminal based on the transmit power field.

In a feasible implementation, the first information is specifically a priority field of control information;

the receiving module is specifically configured to receive a signal including the control information, where the signal including the control information is obtained by setting, by the first terminal, the priority field; and the processing module is specifically configured to identify the terminal type of the first terminal based on the priority field.

In a feasible implementation, the first information is specifically a sequence number of a demodulation reference signal DMRS;

the receiving module is specifically configured to receive a signal including the DMRAS corresponding to the sequence number, where the sequence number is set by the first terminal based on the terminal type of the first terminal; and the processing module is specifically configured to identify the terminal type of the first terminal based on the sequence number.

In a feasible implementation, the first information is specifically a mask of a demodulation reference signal DMRS;

the receiving module is specifically configured to receive a signal including the DMRS processed by using the mask, where the mask is set by the first terminal based on the terminal type of the first terminal; and the processing module is specifically configured to identify the terminal type of the first terminal based on the mask.

In a feasible implementation, the first information is specifically an information element IE of Media Access Control MAC information;

the receiving module is specifically configured to receive a signal including the MAC, where the signal including the MAC is obtained by setting, by the first terminal, the IE; and the processing module is specifically configured to identify the terminal type of the first terminal based on the IE.

In a feasible implementation, the receiving module is specifically configured to receive, by using a transmission resource, the signal that includes the first information and that is sent by the first terminal, where the transmission resource is determined by the first terminal based on the terminal type of the first terminal.

In a feasible implementation, when the terminal type indicates that the first terminal is pedestrian user equipment PUE, the transmission resource includes a reusable resource, and the reusable resource is a resource, of another PUE, reused by the first terminal.

In a feasible implementation, when the terminal type indicates that the first terminal is vehicle user equipment VUE, if the first terminal determines that the first terminal reuses a resource of PUE, the transmission resource includes a reusable resource, and the reusable resource is the resource, of the PUE, reused by the first terminal.

According to a seventh aspect, an embodiment of the present invention provides a terminal, where the terminal is a third terminal, and the third terminal includes:

a processing module, configured to select a first transmission resource based on a terminal type and/or a service type of the third terminal; and a sending module, configured to send a first signal to a fourth terminal by using the first transmission resource.

In a feasible implementation, the third terminal is vehicle user equipment VUE, and the terminal further includes:

a receiving module, configured to receive a second signal sent by the fourth terminal by using a second transmission resource; and the processing module is specifically configured to select a first resource not conflicting with the second transmission resource based on the terminal type and/or the service type of the third terminal.

In a feasible implementation, the third terminal is pedestrian user equipment PUE, and the processing module is specifically configured to:

select an SCI resource at a preset location;

select an SCI resource and a data resource that satisfy a preset mapping relationship; or select an SCI resource in a preset SCI resource pool and a data resource in a preset data resource pool.

According to an eighth aspect, an embodiment of the present invention provides a terminal, where the terminal is a fourth terminal, and the fourth terminal includes:

a receiving module, configured to receive a first signal sent by a third terminal by using a first transmission resource; and a processing module, configured to process the first signal.

In a feasible implementation, the processing module is further configured to determine a terminal type of the third terminal based on the transmission resource.

In a feasible implementation, the processing module is specifically configured to determine whether an SCI resource is located at a preset location, and if it is determined that the SCI resource is located at the preset location, determine that the third terminal is PUE; otherwise, determine that the third terminal is VUE.

In a feasible implementation, the processing module is specifically configured to determine whether an SCI resource and a data resource satisfy a preset mapping relationship; and if it is determined that the SCI resource and the data resource satisfy the preset mapping relationship, determine that the third terminal is PUE; otherwise, determine that the third terminal is VUE.

In a feasible implementation, the processing module is specifically configured to determine whether an SCI resource is located in a preset SCI resource pool and whether a data resource is located in a preset data resource pool; and if it is determined that the SCI resource is located in the preset SCI resource pool and the data resource is located in the preset data resource pool, determine that the third terminal is PUE; otherwise, determine that the third terminal is VUE.

According to a ninth aspect, an embodiment of the present invention provides a terminal, where the terminal is a first terminal, and the first terminal includes: a processor, a memory, a communications interface, and a system bus, where the memory and the communications interface are connected to the processor by using the system bus and complete communication between each other, the memory is configured to store a computer executable instruction, the communications interface is configured to communicate with another device, and the processor is configured to run the computer executable instruction, to enable the first terminal to perform steps of the foregoing method applied to the first terminal.

According to a tenth aspect, an embodiment of the present invention provides a terminal, where the terminal is a second terminal, and the second terminal includes: a processor, a memory, a communications interface, and a system bus, where the memory and the communications interface are connected to the processor by using the system bus and complete communication between each other, the memory is configured to store a computer executable instruction, the communications interface is configured to communicate with another device, and the processor is configured to run the computer executable instruction, to enable the second terminal to perform steps of the foregoing method applied to the second terminal.

According to an eleventh aspect, an embodiment of the present invention provides a terminal, where the terminal is a third terminal, and the third terminal includes: a processor, a memory, a communications interface, and a system bus, where the memory and the communications interface are connected to the processor by using the system bus and complete communication between each other, the memory is configured to store a computer executable instruction, the communications interface is configured to communicate with another device, and the processor is configured to run the computer executable instruction, to enable the third terminal to perform steps of the foregoing method applied to the third terminal.

According to a twelfth aspect, an embodiment of the present invention provides a terminal, where the terminal is a fourth terminal, and the fourth terminal includes: a processor, a memory, a communications interface, and a system bus, where the memory and the communications interface are connected to the processor by using the system bus and complete communication between each other, the memory is configured to store a computer executable instruction, the communications interface is configured to communicate with another device, and the processor is configured to run the computer executable instruction, to enable the fourth terminal to perform steps of the foregoing method applied to the fourth terminal.

In the signal transmission method and the terminal provided in the embodiments of the present invention, the first terminal sets the first information indicating the terminal type of the first terminal, and sends the signal including the first information to the second terminal, so that the second terminal identifies the terminal type of the first terminal based on the first information. In this process, the first information is set, and the signal including the first information is sent to the second terminal, so that the second terminal identifies the terminal type of the first terminal based on the first information and processes the processed signal based on the terminal type of the first terminal, to prevent, by distinguishing types of terminals, signal interference from being caused between different terminals.

Figure 8A:
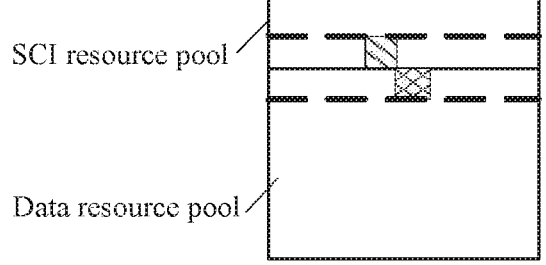
Figure 8B:
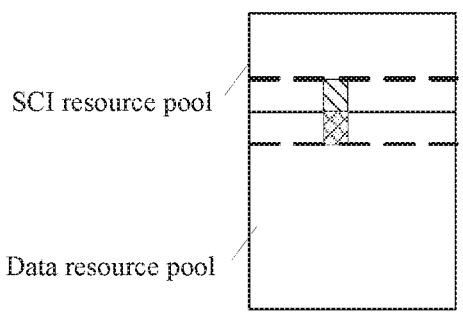
Figure 9A:
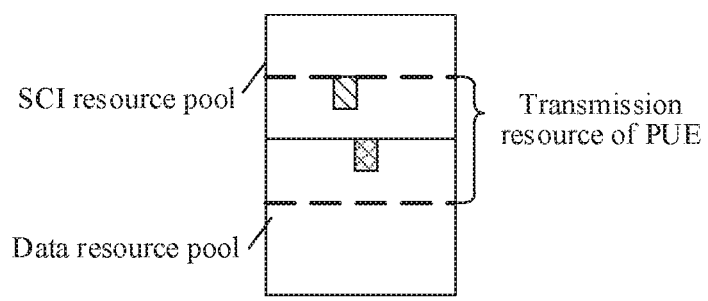
Figure 9B:
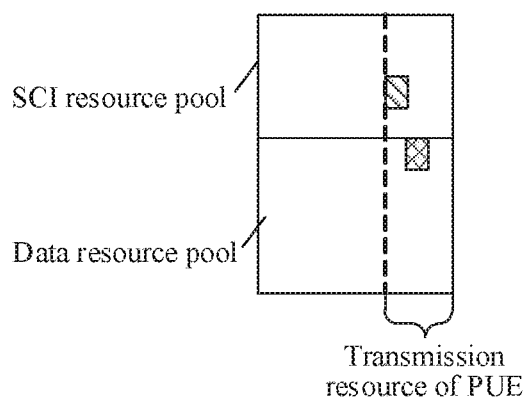
Figure 10:
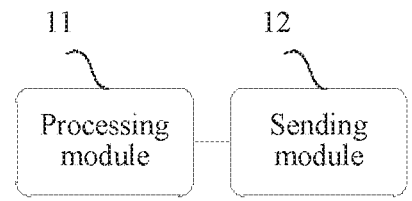
Figure 11:
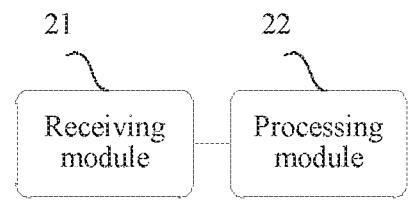
Figure 12:
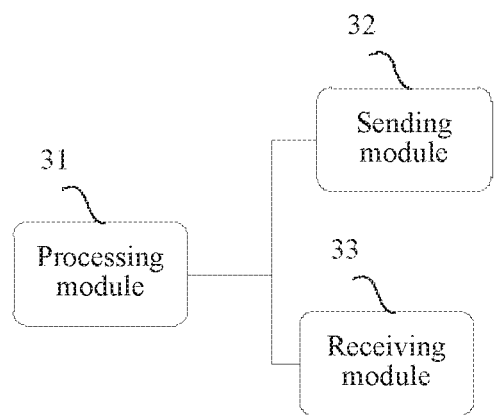
Figure 13:
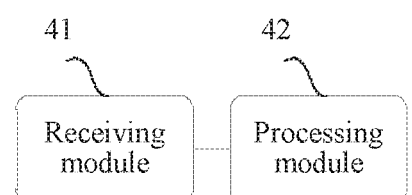
Figure 14:
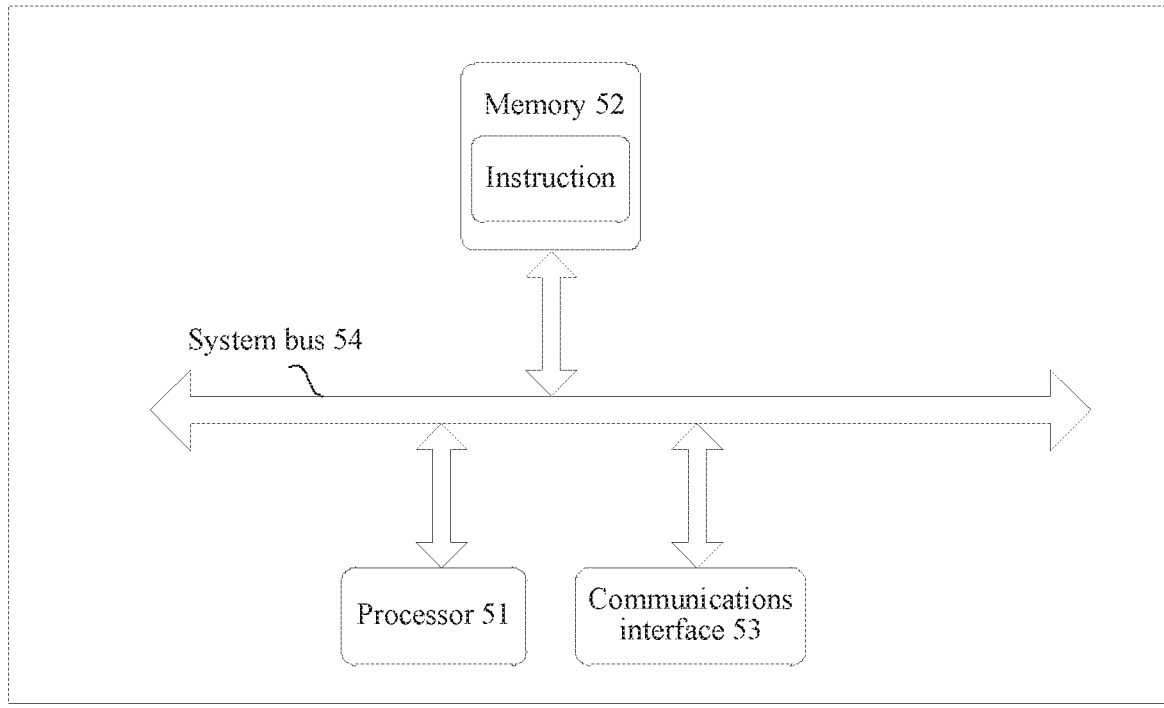
Figure 15:
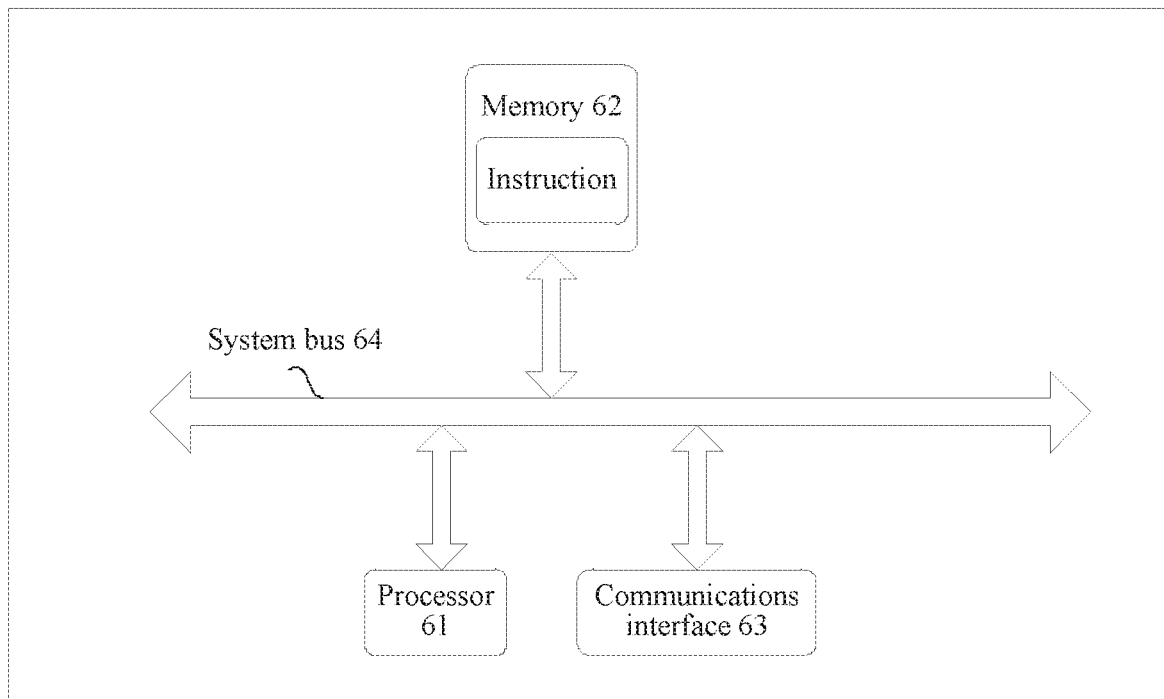
Figure 16:
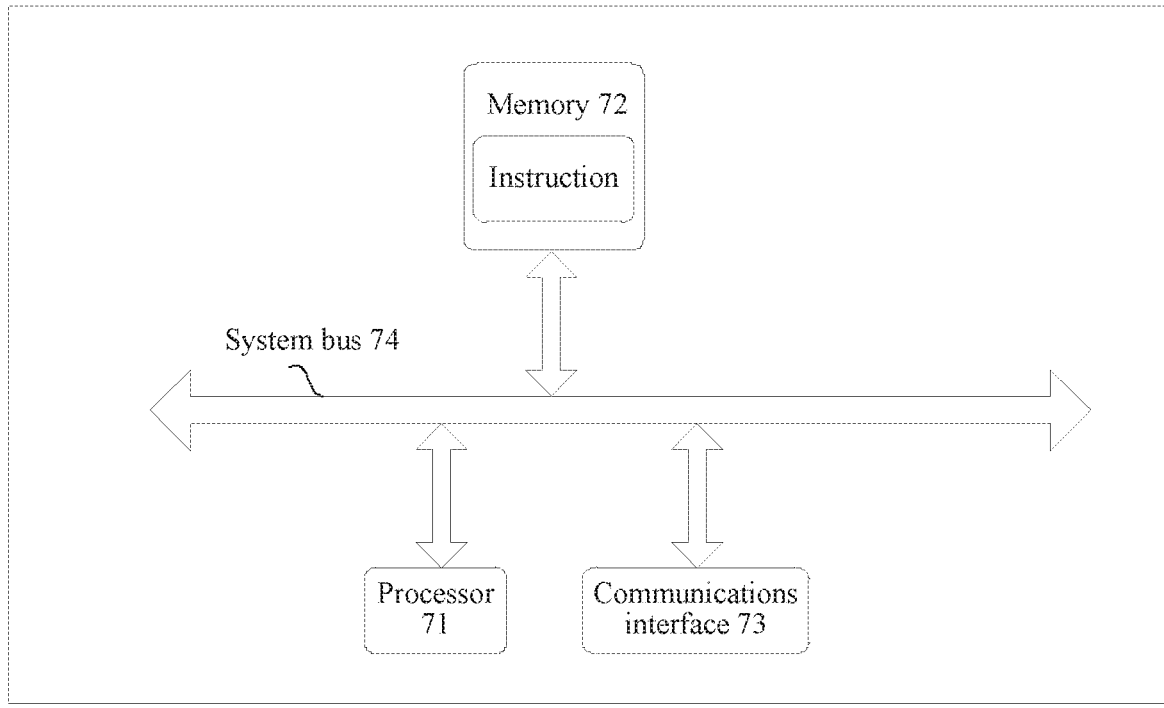
Figure 17:
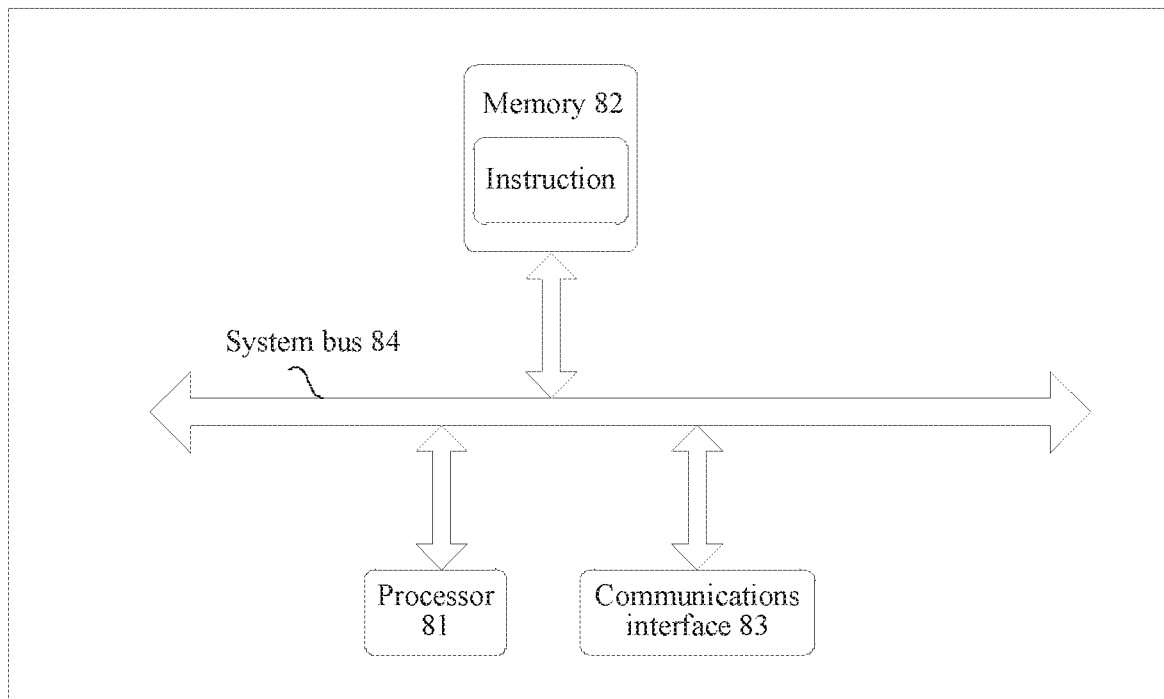

FIG. SA is a schematic diagram of a resource mapping relationship preconfigured for PUE in a terminal type determining method according to the present invention;

FIG. 8B is another schematic diagram of a resource mapping relationship preconfigured for PUE in a terminal type determining method according to the present invention;

FIG. 9A is an example of a schematic diagram of an SCI resource pool and a data resource pool preconfigured for PUE in a terminal type determining method according to the present invention;

FIG. 9B is another example of a schematic diagram of an SCI resource pool and a data resource pool preconfigured for PUE in a terminal type determining method according to the present invention;

FIG. 10 is a schematic structural diagram of Embodiment 1 of a first terminal according to the present invention;

FIG. 11 is a schematic structural diagram of Embodiment 1 of a second terminal according to the present invention;

FIG. 12 is a schematic structural diagram of Embodiment I of a third terminal according to the present invention;

FIG. 13 is a schematic structural diagram of Embodiment 1 of a fourth terminal according to the present invention;

FIG. 14 is a schematic structural diagram of Embodiment 2 of a first terminal according to the present invention;

FIG. 15 is a schematic structural diagram of Embodiment 2 of a second terminal according to the present invention;

FIG. 16 is a schematic structural diagram of Embodiment 2 of a third terminal according to the present invention; and FIG. 17 is a schematic structural diagram of Embodiment 2 of a fourth terminal according to the present invention.

DESCRIPTION OF EMBODIMENTS

Figure 1:
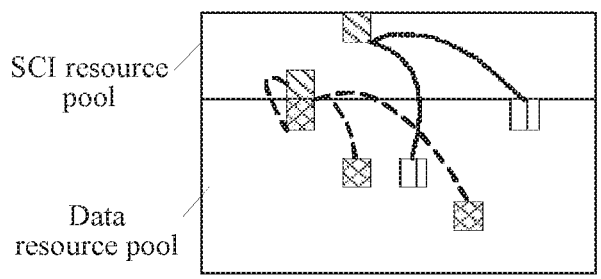
FIG. 1 is a schematic diagram of selecting, by a terminal, a transmission resource based on Mode 2 in V2V communication.

In a D2D communications system, terminals may directly communicate with each other without relay of a network side device. The network side device may perform resource configuration, scheduling, coordination, and the like, to assist the terminals in directly communicating with each other. Usually, the network side device assigns a transmission resource pool to a D2D communications terminal to perform signal transmission, and a resource pool may be understood as a set of a group of time frequency resources. The network side device configures different resource pools such as a scheduling assignment resource pool (Scheduling Assignment pool, SA pool) and a data resource pool (data pool) in a broadcast manner. SA information is transmitted on a physical sidelink control channel (Physical Sidelink Control Channel, PSCCH). Therefore, the SA pool may also be referred to as a sidelink control information resource pool (Sidelink Control Information pool, SCI pool). The data resource pool is configured to transmit a data signal, and the data signal is transmitted on a physical sidelink shared channel (Physical Sidelink Shared Channel, PSSCH). In D2D in Release 12 (Reversion, R12) and Release 13 (Reversion, R13) and. V2V in Release 14 (Reversion, R14), a resource selection method referred to as Mode 2 (Mode2) is defined. To be specific, a terminal autonomously selects a transmission resource from a resource pool. In this case, all terminals select, by using a same mechanism, time frequency resources to transmit signals. For details, refer to FIG. 1. FIG. 1 is a schematic diagram of selecting, by a terminal, a transmission resource based on Mode 2 in V2V communication.

Referring to FIG. 1, an SCI resource pool and a data resource pool use a frequency division multiplexing manner, and each SCI resource may indicate one or more data resources. For example, two SCI resources (for example, shown by slash filling parts in the figure) are shown schematically in the figure, where one SCI resource indicates three data resources (for example, shown by box filling parts in the figure), and the other SA indicates two data resources (for example, shown by vertical-line filling parts in the figure). An SCI resource and a data resource may be in a same subframe or different subframes. For example, in the figure, an SCI resource and a data resource indicated by the SCI resource are located in a same subframe. When a transmission resource is selected, an SCI resource and a data resource need to be selected. For convenience of S receiving, the SCI resource indicates a location of the data resource.

In the foregoing transmission resource selection process, a PELT and VUE use a same transmission resource selection mechanism. Therefore, the VUE and the PUE may transmit signals in a same subframe or even on a same resource block. However, because the VUE is not affected by battery power, the VUE usually transmits a signal by using maximum transmit power (for example, 23 dBm). Because the PUE is affected by battery power, the PUE transmits a signal by using transmit power such as 20 dBm less than the maximum transmit power. Therefore, when the VUE and the PUE choose to transmit signals in a same subframe or even on a same resource block, or when resource blocks are relatively close in frequency band, in-band emission (In-band emission) interference is caused. In this case, when distances from the PUE and the VUE sending signals to a terminal (PUE or VUE) receiving the signals are the same or close, from the perspective of the terminal receiving the signals, a signal of the PUE is likely drowned by a signal of the VUE. To be specific, the signal of the PUE is interfered by the signal of the VUE.

In view of this, embodiments of the present invention provide a signal transmission method and a terminal, to prevent, by distinguishing types of terminals, signal interference from being caused between different terminals.

Technologies described herein may be used for various communications systems in which a plurality of types of terminals exist, for example, a Global System for Mobile communications (Global System for Mobile communications, GSM), a Code Division Multiple Access (Code Division Multiple Access, CDMA) system, a Time Division Multiple Access (Time Division Multiple Access, TDMA) system, Wideband Code Division Multiple Access (Wideband Code Division Multiple Access Wireless, WCDMA), a Frequency Division Multiple Access (Frequency Division Multiple Addressing, FDMA) system, an Orthogonal Frequency Division Multiple Access (Orthogonal Frequency-Division Multiple Access, OFDMA) system, a Single-Carrier FDMA (SC-FDMA) system, a General Packet Radio Service (General Packet Radio Service, GPRS) system, a Long Term Evolution (Long Term Evolution, LTE) system, an E-UTRA system, a SG mobile communications system, and such another communications system.

Among terminals in the embodiments of the present invention, a first terminal is a transmit end, and a second terminal is a receive end, is, for example, user equipment, and may be a wired terminal or a wireless terminal. The wireless terminal may refer to a device that provides a user with voice and/or data connectivity, a handheld device with a wireless connection function, or another processing device connected to a wireless modem. The wireless terminal may communicate with one or more core networks by using a radio access network (for example, RAN, Radio Access Network). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (Personal Communication Service, PCS) phone, a cordless telephone set, a Session Initiation Protocol (SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), a remote terminal (Remote Terminal), an access terminal (Access Terminal), a user terminal (User Terminal), a user agent (User Agent), a user device (User Device), user equipment (User Equipment), PUE, or VUE.

Figure 2:
FIG. 2 is a schematic diagram of a system architecture to which a signal transmission method of the present invention is applicable.

FIG. 2 is a schematic diagram of a system architecture to which a signal transmission method of the present invention is applicable. Referring to FIG. 2, in this system architecture, a first terminal and a second terminal exist, and the first terminal and the second terminal establish a communication connection with each other to perform signal transmission. An uplink scheduling information sending method described in an embodiment of the present invention is described in detail below based on FIG. 2. For details, refer to FIG. 3.

Figure 3:
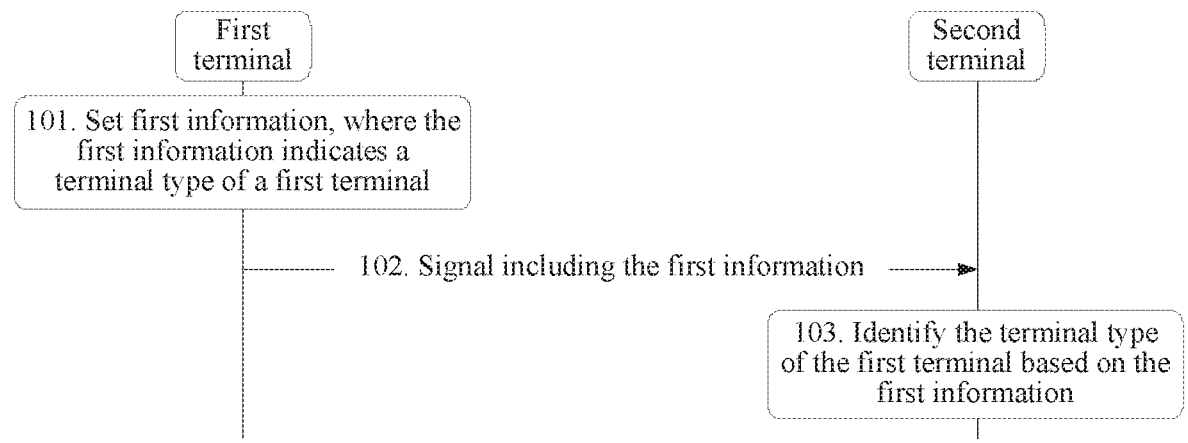
FIG. 3 is a signaling diagram of Embodiment 1 of a signal transmission method according to the present invention.

FIG. 3 is a signaling diagram of Embodiment 1 of a signal transmission method according to the present invention. In this embodiment, a first terminal is a transmit end, a second terminal is a receive end, and this embodiment includes the following steps.

The first terminal sets first information, where the first information indicates a terminal type of the first terminal.

In this embodiment of the present invention, various terminals have respective terminal types, and different terminals are divided, based on terminal types, into different types such as PUE and VUE. In this step, the first terminal sets the first information based on the terminal type of the first terminal. For example, the first information is specifically a type field of control information, and the first terminal sets the type field in the control information based on the terminal type of the first terminal. For another example, different terminal types correspond to demodulation reference signals (Demodulation Reference Signal, DMRS) of different sequence numbers, and the first terminal determines a DMRS of a corresponding sequence number based on the terminal type of the first terminal.

102. The first terminal sends a signal including the first information to the second terminal.

After setting the first information, the first terminal sends the signal including the first information to the second terminal. Correspondingly, the second terminal receives the signal including the first information.

103. The second terminal identifies the terminal type of the first terminal based on the first information.

In this step, after receiving the signal including the first information, the second terminal determines the type of the first terminal based on the first information. For example, the first information is specifically a type field of control information, and the second terminal may determine the terminal type of the first terminal based on the type indication field.

In the signal transmission method provided in this embodiment of the present invention, the first terminal sets the first information indicating the terminal type of the first terminal, and sends the signal including the first information to the second terminal, so that the second terminal identifies the terminal type of the first terminal based on the first information. In this process, the first information is set, and the signal including the first information is sent to the second terminal, so that the second terminal identifies the terminal type of the first terminal based on the first information and processes the processed signal based on the terminal type of the first terminal, to prevent, by distinguishing types of terminals, signal interference from being caused between different terminals.

In the foregoing embodiment, the first terminal sets the first information, where the first information indicates the terminal type of the first terminal, and then the first terminal sends the signal including the first information to the second terminal, so that the second terminal may identify the terminal type of the first terminal based on the first information. However, the present invention is not limited thereto. In another feasible implementation, alternatively, the first terminal may set the first information, where the first information indicates a service type of the first terminal, and then the first terminal sends the signal including the first information to the second terminal, so that the second terminal may identify the service type of the first terminal based on the first information. For example, the service type of the first terminal may be indicated in SCI by using two bits, as shown in Table 0:

TABLE 0

| Bit b0b1 | Service type |
|---|---|
| 00 | V2V service |
| 01 | V2P service |
| 10 | P2V service |
| 11 | V2I service |

Based on Table 0, the first terminal may explicitly indicate a service type to the second terminal by using SCI.

In the foregoing embodiment, different transmission resources are set for terminals of different terminal types in advance, and the first terminal determines a transmission resource corresponding to the terminal type based on the terminal type of the first terminal.

For example, when the first terminal is PUE, a transmission resource of the PUE is set to include an idle resource in a resource pool, and/or a reusable resource, and the reusable resource is a reserved resource, of another PUE, reused by the first terminal.

Specifically, when a listening result of the PUE satisfies a preset condition, the reserved resource of the another PUE can be reused. The preset condition is that before performing resource selection, the PUE first scans the resource pool, determines, after the scanning, an available resource based on a result of SA decoding and a result of energy or transmit power of a received signal (including SA or Data, or both SA and Data), and if the result of SA decoding indicates that no idle resource exists, when the energy or the transmit power of the received signal is less than a threshold, the PUE can reuse a resource of the another PUE.

For another example, when the first terminal is VUE, before performing resource selection, the VUE first scans the resource pool, and excludes all reserved resources of the PUE front available resources after the scanning. Additionally, the VUE may further determine whether the VUE can reuse a resource of the PUE. If the VUE can reuse the resource of the PUE, the transmission resource further includes a reusable resource, that is, a resource, of another PUE, reused by the first terminal. If the VUE cannot reuse the resource of the PUE, the transmission resource includes only an available resource in the resource pool. The first terminal may determine whether the first terminal can reuse the resource of the PUE in any one of the following manners:

Manner 1. The first terminal determines whether enemy of a received signal is less than a first threshold, and if the energy of the received signal is less than the first threshold, the first terminal can reuse the resource of the PUE; otherwise, the first terminal cannot reuse the resource of the PUE.

Manner 2. The first terminal determines whether power of a received signal is less than a second threshold, and if the power of the received signal is less than the second threshold, the first terminal can reuse the resource of the PUE; otherwise, the first terminal cannot reuse the resource of the PUE.

Manner 3. The first terminal determines whether power of a signal transmitted by the first terminal is less than a third threshold, and if the power of the signal transmitted by the first terminal is less than the third threshold, determines that the first terminal can reuse the resource of the PUE.

In the foregoing various manners, the first threshold, the second threshold, and the third threshold may be set based on requirements. For example, when the first terminal falls within a coverage area of a network side device, the network side device may configure or preconfigure the first threshold, the second threshold, and the third threshold by using a system information block (System Information Block, SIB). For another example, when the first terminal falls beyond the coverage area of the network side device, the first threshold, the second threshold, and the third threshold may be preconfigured.

In the foregoing transmission resource determining process, the terminal type of the first terminal is known to the first terminal. Therefore, the first terminal may select a corresponding transmission resource based on the terminal type of the first terminal. For example, when the first terminal is VUE, the VUE and the PUE may be prevented from selecting a same transmission resource by preventing the VUE and the PUE from reusing a resource, to further prevent a signal of the EVE from causing interference to a signal of the PUE.

Additionally, in the foregoing transmission resource determining process, when the first terminal is specifically VUE, whether the VUE can reuse a resource of the PUE may be implemented in a configuration manner.

When the VUE falls within the coverage area of the network side device, the network side device may send configuration information to the VUE, where the configuration information indicates whether the VUE can reuse a resource of the PUE. After receiving the configuration information, the VUE determines, based on the configuration information, whether to reuse a resource of the PUE. For example, the network side device may configure that the VUE is prohibited from reusing the resource of the PUE in any case. For another example, the network side device may configure that the VUE can reuse the resource of the PUE only when a received signal of the VUE satisfies a particular condition.

When the VUE falls beyond the coverage area of the network side device, the VUE may determine, based on preconfiguration information, whether the VUE reuses a resource of the PUE, where the preconfiguration information is preconfigured. For example, it may be preconfigured that the VUE is prohibited from reusing the resource of the PUE in any case. For another example, it may be preconfigured that the VUE can reuse the resource of the PUE only when a received signal of the VUE satisfies a particular condition.

In the foregoing embodiment, the terminal type of the first terminal may be explicitly or implicitly indicated at a physical layer or a Media. Access Control (Media Access Control, MAC) layer, for example, may be indicated by using SA which is also referred to as sidelink control information (Sidelink Control information, SCI), a DMRS, or MAC information. How the first terminal indicates the terminal type of the first terminal to the second terminal in an explicit or implicit manner by using the physical layer or MAC in the foregoing embodiment is described in detail below by using several different embodiments.

In a feasible implementation, the first information is specifically a type field of control information, and the control information is, for example, SCI information. The first terminal may indicate the terminal type of the first terminal to the second terminal explicitly by using the control information at the physical layer.

Specifically, an example in which the control information is specifically SCI is used, and the first terminal sets a type field of the SCI based on the terminal type of the first terminal. The type field is a newly added field, and the newly added field is used to explicitly indicate a terminal type (UE Type). For example, the terminal type of the first terminal may he indicated in SCI by using one bit, as shown in Table 1:

TABLE 1 example of terminal type field

| Bit b0 | Terminal type |
|---|---|
| 0 | PUE |
| 1 | VUE |

In Table 1, in SCI, when a value in the type field is 0, it indicates that the first terminal is PUE; and when a value in the type field is 1, it indicates that the first terminal is VUE. It should be noted that, when a relatively large quantity of terminal types exist, the terminal types may he indicated by using a plurality of bits in the type field.

Figure 4:
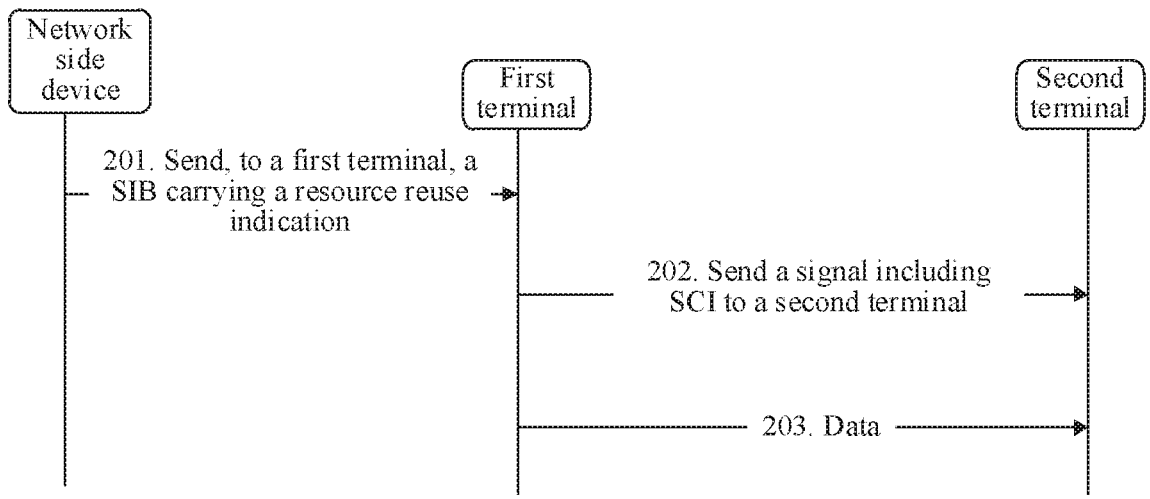
FIG. 4 is a signaling diagram of explicitly indicating a terminal type by using SCI in a signal transmission method according to the present invention.

The foregoing process of explicitly indicating the terminal type by using the SCI is described in detail below by using an example in which the first terminal falls within the coverage area of the network side device. For details, refer to FIG. 4. FIG. 4 is a signaling diagram of explicitly indicating a terminal type by using SCI in a signal transmission method according to the present invention. The method includes the following steps.

201. A network side device sends, to a first terminal, a SIB carrying a resource reuse indication.

In this step, the network side device adds the resource reuse indication to the SIB and sends the SIB to the first terminal, to indicate whether the first terminal reuses a resource of PUE when the first terminal is VUE. For example, the SIB carries the one-bit resource reuse indication. If the resource reuse indication is 0, it indicates that the first terminal whose terminal type is the VUE is prohibited from reusing the resource of the PUE; and if the resource assignment indication is 1, it indicates that the first terminal can reuse the resource of the PUE only when a received signal of the first terminal whose terminal type is the VUE satisfies a particular condition.

202. The first terminal sends a signal including SCI to a second terminal.

In this step, the first terminal sets a type field in the SCI based on a terminal type of the first terminal, and sends, to the second terminal, a signal including the SCI whose type field is set.

203. The first terminal sends data to the second terminal.

In this step, the first terminal sends the data on a data resource indicated by the SCI.

In this embodiment, the type field indicating the terminal type is added to the sidelink control information SCI, so that the first terminal sets the type field based on the terminal type of the first terminal, and sends the signal including the control information to the second terminal, to explicitly indicate the terminal type by using the sidelink control information SCI.

In another feasible implementation, the first terminal may implicitly indicate the terminal type of the first terminal to the second terminal by using the control information at the physical layer.

For example, an example in which the control information is specifically SCI is used, and the first terminal sets a signal period (Period) field of the SCI based on the terminal type of the first terminal. The signal period field is a newly added field, and different terminal types correspond to different signal period fields. It is assumed that the first terminal indicates a signal period of the first terminal by using two bits in the SCI, as shown in Table 2:

TABLE 2 example of signal period

| b0b1 | Signal period | Example and mapping of signal period length |
|---|---|---|
| 00 | Period0 | shortest signal period such as 50 ms |
| 01 | Period1 | 100 ms |
| 10 | Period2 | 150 ms |
| 11 | Period3 | 200 ms used for PUE |

In Table 2, in an SA signal, when a value in a signal period field is 00, it indicates that a signal period is a shortest signal period Period0, and Period0 is, for example, 50 ms; when a value in a signal period field is 01, it indicates that a signal period is Period1, and Period1 is, for example. 100 ms; when a value in a signal period field is 10, it indicates that a signal period is Period2, and Period2 is, for example, 150 ms; and when a value in a signal period field is 11, it indicates that a signal period is Period3, and Period3 is, for example, 200 ms. Period0 to Period2 are used for VUE, and Period3 is used for PUE.

In this embodiment, the first terminal sets the signal period field in the control information based on the terminal type of the first terminal, and sends, to the second terminal by using a transmission resource based on a period indicated by the signal period field, a signal including the control information whose signal period field is set; and correspondingly, the second terminal receives the signal including the control information whose signal period field is set, and determines a terminal type of the second terminal based on the signal period field.

Generally, a generation frequency of a V2V message is related to a movement speed of UE, and a higher movement speed of the UE indicates a higher generation frequency of the V2V message; and correspondingly, indicates a higher sending frequency of the V2V message. In this embodiment, movement speeds of the PUE and the VUE differ greatly. To be specific, the PUT is at a relatively low speed and has a relatively long signal period, and the VUE is at a relatively high speed and has a relatively short signal period. Therefore, a relatively long signal period is reserved for the PUE, to implicitly indicate a terminal type by using a signal period in the control information.

For another example, an example in which the control information is specifically SCI is used, and the first terminal sets a transmit power field of the SCI, that is, sets a transmit power level (Transmission Power Level) based on the terminal type of the first terminal. The transmit power field is a newly added field, and different terminal types correspond to different transmit power levels. It is assumed that the first terminal indicates a transmit power level of the first terminal by using one bit in the SCI, as shown in Table 3:

TABLE 3 example of transmit power field

| b0 | Transmit power level | Example and mapping relationship of transmit power corresponding to transmit power level |
|---|---|---|
| 0 | Level0 | 20 dBm used for PUE |
| 1 | Level1 | 23 dBm used for VUE |

In Table 3, in SCI, when a value in a transmit power field is 0, it indicates that a transmit power level is Level0 used for PUE; and when a value in a transmit power field is 1, it indicates that a transmit power level is Level1 used for VUE.

In this embodiment, the first terminal sets the transmit power field in the control information based on the terminal type of the first terminal, and sends, to the second terminal by using a transmission resource based on transmit power indicated by the transmit power field, a signal including the control information whose transmit power field is set; and correspondingly, the second terminal receives the signal including the control information whose transmit power field is set, and determines a terminal type of the second terminal based on the transmit power field. Because the VUE usually transmits a signal by using maximum transmit power, the PUE transmits a signal by using transmit power less than the maximum transmit power in this embodiment, the terminal type is implicitly indicated by using transmit power.

For another example, an example in which the control information is SCI is still used, and the first terminal sets a priority (Priority) field of the SCI based on the terminal type of the first terminal. The priority field is a newly added field, and different terminal types correspond to different priority levels. It is assumed that the first terminal indicates a priority level of the first terminal by using two bits in the SCI, as shown in Table 4:

TABLE 4 example of priority field

| b0b1 | Priority | Example and mapping of priority length |
|---|---|---|
| 00 | 0 | Highest priority used for only PUE |
| 01 | 1 | VUE having a high priority or VUE having a high-priority service, for example, an ambulance |
| 10 | 2 | VUE having an intermediate priority or VUE having an intermediate-priority service, for example, a bus |
| 11 | 3 | VUE having an intermediate priority or VUE having a low-priority service, for example, a private car |

In Table 4, in SCI, when a value in a priority field is 00, it indicates that a priority is highest and is used for only PUE; and when values in priority fields are 01, 10, and 11, it indicates that priorities sequentially decrease and are mainly used for VUE.

In this embodiment, the first terminal sets the priority field in the control information based on the terminal type of the first terminal, and sends, to the second terminal by using a transmission resource based on a priority indicated by the priority field, a signal including the control information whose priority field is set; and correspondingly, the second terminal receives the signal including the control information whose priority field is set, and determines a terminal type of the second terminal based on the priority field, to implicitly indicate the terminal type by using the priority.

In the foregoing embodiments, the first terminal implicitly indicates the terminal type of the first terminal to the second terminal by separately using the signal period field, the transmit power field, and the priority field. However, the present invention is not limited thereto. In another feasible implementation, when the first terminal needs to indicate a service type to the second terminal, the first terminal may also similarly implicitly indicate the service type to the second terminal by setting the signal period field, the transmit power field, and the priority field and then sending, by the first terminal, the signal including the first information to the second terminal.

Additionally, in the foregoing embodiments, the first terminal implicitly indicates the terminal type of the first terminal to the second terminal by separately using the signal period field, the transmit power field, and the priority field. However, the present invention is not limited thereto. In another feasible implementation, it is assumed that when no special value is reserved for the PUE in the signal period field, the transmit power field, or the priority field, a terminal type may be implicitly indicated by using a combination of the signal period field, the transmit power field, and the priority field.

For example, no transmit power corresponding to the PUE exists in the transmit power field. To be specific, all values in the transmit power field are set for the VUE, and the PUE may be indicated by using a combination 1 (highest priority+maximum signal period). Only when a value in the priority field in the control information indicates a highest priority and a value in the signal period field indicates a maximum signal period, it indicates that the control information is information sent by the PUE. To be specific, the first terminal is the PUE. Similarly, when no signal period corresponding to the PUE exists in the signal period field, the PUE may be indicated by using a combination 2 (highest priority+lowest transmit power); or when no priority corresponding to the PUE exists in the priority field, the PUE may be indicated by using a combination 3 (maximum signal period+lowest transmit power)

In still another feasible implementation, the first information is specifically a sequence number of a demodulation reference signal DMRS.

For example, the first terminal may implicitly indicate the terminal type of the first terminal to the second terminal by using the sequence number of the DMRS. Specifically, different DMRSs have different sequence numbers. It is assumed that 29 different DMRSs exist, and sequence numbers of the 29 DMRSs are, for example, 0 to 28. Therefore, terminals of different terminal types may be distinguished by using sequence numbers of different DMRSs. For example, the first terminal and the second terminal store a correspondence table of DMRSs and sequence numbers in advance, a sequence number of a DMRS of VUE is set to 1, and a sequence number of a DMRS of PUE is set to 2. When the second terminal receives a signal including the DMRS whose sequence number is 1, it can be learned through table lookup that a terminal type corresponding to the sequence number 1 is VUE, and the first terminal is identified as VUE. In this process, the DMRS may be a DMRS of SCI, a DMRS of data (Data) information, or a DMRS of both SCI and data information.

For another example, the first terminal may implicitly indicate the terminal type of the first terminal to the second terminal by using a mask of a DMRS. Specifically, it is assumed that all UEs including VUE, PUE, and UE of another terminal type use a DMRS having a same sequence number. In this case, different masks may be set for terminals of different terminal types, and the DMRS is processed based on the masks, thereby distinguishing different terminals. For example, it is assumed that all terminals use the DMRS whose sequence number is 1. For the VUE, a mask is set to 1, and all symbols of the DMRS whose sequence number is I are multiplied by 1, to obtain the DMRS of the VUE. In this process, all symbols of the DMRS are multiplied by 1, and an obtained new DMRS is the same as the DMRS whose sequence number is 1; and for the PUE, a mask is set to −1, and all symbols of the DMRS Whose sequence number is 1 are multiplied by (−1), to obtain the DMRS of the PUE. In this process, the DMRS may be a DMRS of SCI, a DMRS of data (Data) information, or a DMRS of both SCI information and data information. Next, how the first terminal processes a DMRS based on different masks to obtain DMRSs of terminals of different terminal types is described in detail by using two examples.

EXAMPLE 1

Figure 5A:
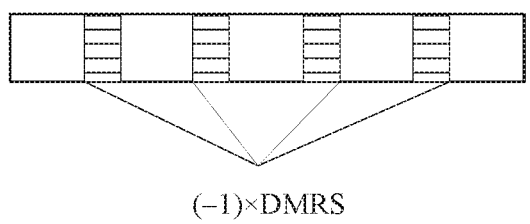
FIG. 5A is an example of a schematic diagram of processing a DMRS by using a mask in a signal transmission method according to the present invention.

When the first terminal is PUE, all symbols of a DMRS are multiplied by (−1). To be specific, all symbols (as shown by horizontal-line filling parts in the figure) are negated. For details, refer to FIG. 5A. FIG. 5A is an example of a schematic diagram of processing a DMRS by using a mask in a signal transmission method according to the present invention.

EXAMPLE 2

Figure 5B:
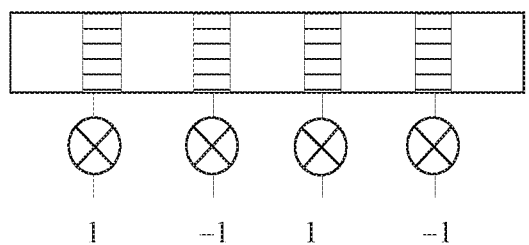
FIG. 5B is another example of a schematic diagram of processing a DMRS by using a mask in a signal transmission method according to the present invention.

When the first terminal is PUE, symbols of a DMRS are multiplied by a four-bit mask such as (1, −1, 1, −1). To be specific, some symbols are negated. For details, refer to FIG. 5B. FIG. 5B is another example of a schematic diagram of processing a DMRS by using a mask in a signal transmission method according to the present invention.

In the foregoing method, the DMRS carries the terminal type, and DMRSs of terminals of different terminal types have different sequence numbers or are obtained by processing DMRSs of a same sequence number by using different masks, to implicitly indicate the terminal type by using the DMRS.

It should be noted that, when the first terminal needs to indicate a service type to the second terminal, the foregoing manner may be used similarly. For example, for different service types, different required DMRSs are respectively used. For another example, for different service types, a same DMRS is processed by using different masks.

In yet another feasible implementation, the first information is specifically Media Access Control (Media Access Control, MAC) information, and the first terminal may explicitly indicate the terminal type of the first terminal to the second terminal by using the MAC information at a MAC layer.

Specifically, the first terminal sets a terminal type information element (Information Element, IE) in a MAC header (MAC Header) of the MAC information based on the terminal type of the first terminal. The MAC header is carried in a data part, and the terminal type may be indicated by using one or more bits. For example, when a value of the IE in the MAC header is 0, it indicates that the first terminal is VUE; and when a value of the IE in the MAC header is 1, it indicates that the first terminal is PUE. After receiving a signal including the MAC information, the second terminal determines the terminal type of the first terminal based on the IE in the MAC information.

In the foregoing method, the MAC information carries the terminal type, and values of IEs of MAC information headers of terminals of different terminal types are different, to explicitly indicate the terminal type by using the MAC information. In this manner, the first terminal cannot learn of a reserved resource of the PUE in a listening process, and therefore cannot determine different transmission resources based on different UE types.

It should be noted that, when the first terminal needs to indicate a service type to the second terminal, the first terminal may similarly explicitly indicate the service type of the first terminal to the second terminal by using the MAC information at the MAC layer. For example, the terminal type may be indicated by using two bits. When a value of the IE in the MAC header is 00, it indicates that a service of the first terminal is a V2V service; when a value of the IE in the MAC header is 01, it indicates that a service of the first terminal is a P2V service when a value of the IF in the MAC header is 10, it indicates that a service of the first terminal is a V2P service; and when a value of the IE in the MAC header is 11, it indicates that a service of the first terminal is a V2I service.

Figure 6:
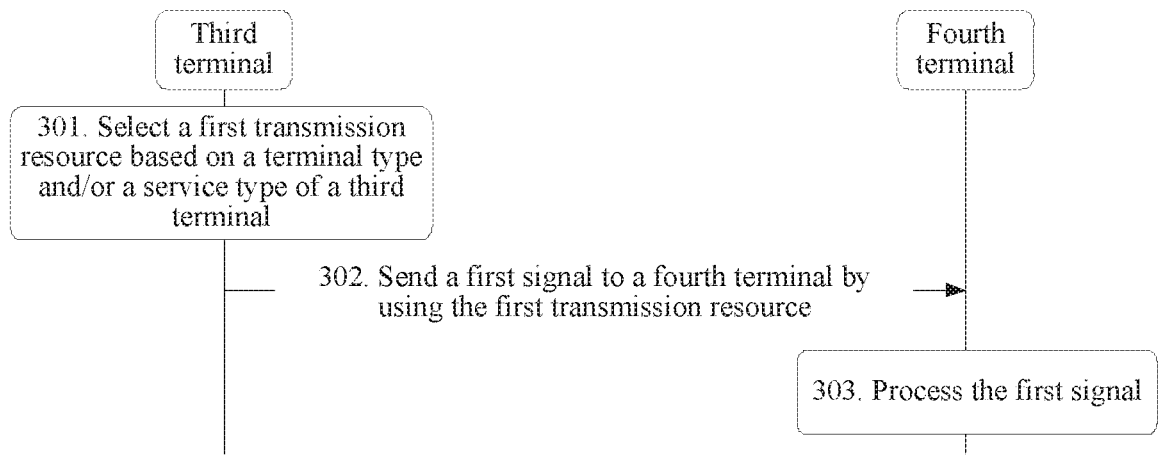
FIG. 6 is a signaling diagram of Embodiment 1 of a transmission resource selection method according to the present invention.

FIG. 6 is a signaling diagram of Embodiment 1 of a transmission resource selection method according to the present invention. The method includes the following steps.

301. A third terminal selects a first transmission resource based on a terminal type and/or a service type of the third terminal.

In this embodiment of the present invention, a mapping relationship between an independent resource block or SCI resource and a data resource is designated in advance for terminals of different terminal types, or independent resource pools are assigned to terminals of different terminal types. Alternatively, a mapping relationship between an independent resource block or SCI resource and a data resource is designated in advance for services of different service types, or independent resource pools are assigned to services of different service types. Additionally, a terminal type and a service type may alternatively be combined to jointly set the first transmission resource. In this step, the third terminal selects the first transmission resource corresponding to the terminal type of the third terminal.

302. The third terminal sends a first signal to a fourth terminal by using the first transmission resource.

After determining the first transmission resource, the third terminal sends the first signal to the fourth terminal by using the first transmission resource; and correspondingly, the fourth terminal receives the first 303. The fourth terminal processes the first information.

After receiving the first signal sent by the third terminal by using the first transmission resource, the fourth terminal processes the first signal. For example, the fourth terminal determines the terminal type of the third terminal based on the transmission resource. If it is determined that the third terminal is PUE, the fourth terminal preferentially processes the first signal; otherwise, if it is determined that the third terminal is VUE, it is considered that a priority of the first signal is relatively low.

In the terminal type determining method provided in this embodiment of the present invention, after selecting a first transmission resource based on a terminal type and/or a service type of the third terminal, the third terminal sends a first signal to a fourth terminal by using the first transmission resource, and the fourth terminal processes the first signal. In this process, the third terminal selects the first transmission resource based on the terminal type and/or the service type of the third terminal, so that transmission resources selected by terminals of different terminal types are different, to prevent interference from being caused between signals sent by the terminals of the different terminal types; and similarly, the third terminal may alternatively select corresponding resources based on different service types, to prevent interference from being caused between services of the different service types.

Optionally, in the foregoing embodiment, the third terminal is vehicle user equipment VUE, and the method further includes: receiving, by the third terminal, a second signal sent by the fourth terminal by using a second transmission resource; and the selecting, by a third terminal, a first transmission resource based on a terminal type and/or a service type of the third terminal includes: selecting, by the third terminal, a first resource not conflicting with the second transmission resource based on the terminal type and/or the service type of the third terminal.

The foregoing terminal type determining method is described in detail below by using several different embodiments.

In a feasible implementation, a transmission resource is specifically an SCI resource, and the fourth terminal determines whether the SCI resource is located at a preset location; and if the fourth terminal determines that the SCI resource is located at the preset location, it is determined that the third terminal is PUE; otherwise, it is determined that the third terminal is VUE.

Specifically, an independent resource block is preconfigured for the PUE, and the resource block is only used by the PUE to send a signal including SCI. For example, when the PUE falls within a coverage area of a network side device, the network side device may configure a resource block or preconfigure a resource block by using a SIB; and When the PUE falls beyond the coverage area of the network side device, the network side device may preconfigure a resource block.

Figure 7:
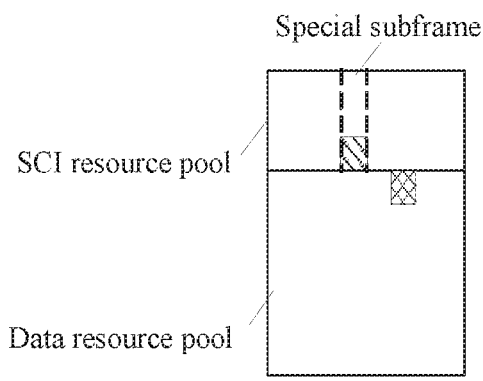
FIG. 7 is a schematic diagram of a resource block preconfigured for PUE in a terminal type determining method according to the present invention.

When receiving a signal sent by the third terminal by using a transmission resource, the fourth terminal may determine a type of the third terminal based on the transmission resource. For details, refer to FIG. 7. FIG. 7 is a schematic diagram of a resource block preconfigured for PUE in a terminal type determining method according to the present invention. Referring to FIG. 7, it is assumed that a resource block that is used to send a signal including SCI and that is preconfigured for PUE is located in a special subframe. For example, a subframe used by the PUE to send the signal including the SCI is assigned every ten ms in an SCI resource pool, and a signal including SCI for VUE cannot be sent in the subframe. When receiving a signal that includes SCI and that is sent by a third terminal by using a transmission resource, a fourth terminal determines Whether the transmission resource is located in a special subframe, and if the transmission resource is located in a special subframe, it indicates that the third terminal is PUE; otherwise, it indicates that the third terminal is VUE.

In another feasible implementation, the foregoing transmission resource is specifically a scheduling assignment SCI resource and a data resource, and the fourth terminal determines whether the SCI resource and the data resource satisfy a preset mapping relationship; and if the fourth terminal determines that the SCI resource and the data resource satisfy the preset mapping relationship, it is determined that the third terminal is PUE; otherwise, it is determined that the third terminal is VUE.

Specifically, a mapping relationship between an SCI resource and a data resource is preconfigured for the PUE. For example, when the PUE falls within a coverage area of a network side device, the network side device may configure a mapping relationship or preconfigure a mapping relationship by using a SIB; and when the PUE falls beyond the coverage area of the network side device, the network side device may preconfigure a mapping relationship.

When receiving a signal sent by the third terminal by using a transmission resource, the fourth terminal may determine the terminal type of the third terminal based on the mapping relationship between an SCI resource and a data resource. For details, refer to FIG. 8A and FIG. 8B. FIG. 8A is a schematic diagram of a resource mapping relationship preconfigured for PUE in a terminal type determining method according to the present invention. Referring to FIG. 8A, it is assumed that in a transmission resource preconfigured for PUE, an SCI resource (as shown by a slash filling part in the figure) and a data resource (as shown by a box filling part in the figure) are neighboring in frequency domain and differ by a subframe in time domain, and a mapping relationship between an SCI resource and a data resource of a transmission resource of VUE is different from a mapping relationship of the PUE. When receiving an SA signal sent by a third terminal by using a transmission resource, a fourth terminal determines whether a mapping relationship between an SCI resource and a data resource of the transmission resource satisfies a condition that the SCI resource and the data resource are neighboring in frequency domain and differ by a subframe in time domain, and if the mapping relationship satisfies the condition, it indicates that the third terminal is PUE; otherwise, the third terminal is VUE, FIG. 8B is another schematic diagram of a resource mapping relationship preconfigured for PUE in a terminal type determining method according to the present invention. Referring to FIG. 8B, it is assumed that in a transmission resource preconfigured for PUE, an SCI resource (as shown by a slash filling part in the figure) and a data resource (as shown by a box filling part in the figure) are neighboring in frequency domain and are located in a same subframe in time domain, and a mapping relationship between an SCI resource and a data resource of a transmission resource of VUE is different from a mapping relationship of the PUE. When receiving a signal that includes SCI and that is sent by a third terminal by using a transmission resource, a fourth terminal determines whether a mapping relationship between an SCI resource and a data resource of the transmission resource satisfies a condition that the SCI resource and the data resource are neighboring in frequency domain and are located in a same subframe in time domain, and if the mapping relationship satisfies the condition, it indicates that the third terminal is PUE; otherwise, the third terminal is VUE.

The implementation of the present invention is described in detail by using an example in which a mapping relationship between an SCI resource and a data resource is that the SCI resource and the data resource are neighboring in frequency domain and differ by a subframe in time domain in FIG. 8A, and by using an example in which a mapping relationship between an SCI resource and a data resource is that the SCI resource and the data resource are neighboring in frequency domain and are located in a same subframe in time domain in FIG. 8B. However, the present invention is not limited thereto. In another feasible implementation, an SCI resource and a data resource may alternatively satisfy another mapping relationship. For example, a time domain start location of the data resource is marked as $t_{DATA}$, and a time domain start location of the SCI resource is marked as $t_{SA}$. A frequency domain start location of the data resource is marked as $f_{DATA}$, a frequency domain start location of the SCI resource is marked as $f_{SA}$, and a mapping relationship between the SCI resource and the data resource may be, for example, indicated by using the following formulas:

$$t_{DATA} - t_{SA} = X \quad (1)$$

$$f_{DATA} - f_{SA} = Y \quad (2)$$

or $$t_{DATA} - t_{SA} \leq X \quad (3)$$

$$f_{DATA} - f_{SA} = Y \quad (4)$$

or $$t_{DATA} - t_{SA} \geq X \quad (5)$$

$$f_{DATA} - f_{SA} \geq Y \quad (6)$$

or $$t_{DATA} - t_{SA} \leq X \quad (7)$$

$$f_{DATA} - f_{SA} \geq Y \quad (8)$$

or $$t_{DATA} - t_{SA} \geq X \quad (9)$$

$$f_{DATA} - f_{SA} \leq Y \quad (10)$$

In the foregoing formulas, as an example, X may be configured to use a subframe length as a unit, and Y may be configured to use a resource block (Resource Block, RB) as a unit.

In the foregoing method, a mapping relationship between an independent resource block or SCI resource and a data resource is designated in advance for terminals of different terminal types, to distinguish different terminal types.

In yet another feasible implementation, a transmission resource includes a scheduling assignment SCI resource and a data resource; the fourth terminal determines whether the SCI resource is located in a preset SCI resource pool and whether the data resource is located in a preset data resource pool; and if the fourth terminal determines that the SCI resource is located in the preset SCI resource pool and the data resource is located in the preset data resource pool, it is determined that the third terminal is PUE; otherwise, it is determined that the third terminal is VUE.

Specifically, an independent resource pool is assigned to the PUE in advance. For example, when the PUE falls within a coverage area of a network side device, the network side device may configure an independent resource pool or preconfigure a resource pool by using a SIB; and when the PUE falls beyond the coverage area of the network side device, the network side device may preconfigure an independent resource pool.

When receiving a signal sent by the third terminal by using a transmission resource, the fourth terminal may determine a type of the third terminal depending on whether the signal is located in an independent resource pool specially configured for the PUE. For details, refer to FIG. 9A and FIG. 9B. FIG. 9A is an example of a schematic diagram of an SCI resource pool and a data resource pool preconfigured for PUE in a terminal type determining method according to the present invention. Referring to FIG. 9A, it is assumed that a resource pool preconfigured for PUE and a resource pool configured for VUE are distinguished in a frequency division multiplexing manner. When a fourth terminal receives a signal sent by a third terminal, if the signal is a signal including SCI, whether an SCI resource for transmitting the signal including the SCI is located in an SCI resource pool of the PUE is determined. If the SCI resource is located in the SCI resource pool, whether a data resource indicated by the signal including the SCI is located in a data resource pool of the PUE is further determined. If the data resource is located in the data resource pool, it indicates that the third terminal is PUE; otherwise, the third terminal is VUE.

FIG. 9B is another example of a schematic diagram of an SCI resource pool and a data resource pool preconfigured for PUE in a terminal type determining method according to the present invention. Referring to FIG. 9B, it is assumed that a resource pool preconfigured for PUE and a resource pool configured for VUE are distinguished in a time division multiplexing manner. When a fourth terminal receives a signal sent by a third terminal, if the signal is a signal including SCI, whether an SCI resource for transmitting the signal including the SCI is located in an SCI resource pool of the PUE is determined. If the SCI resource is located in the SCI resource pool, whether a data resource indicated by the signal including the SCI is located in a data resource pool of the PUE is further determined. If the data resource is located in the data resource pool, it indicates that the third terminal is PUE; otherwise, the third terminal is VUE.

By using the foregoing method, different resource pools may be assigned to the PUE and the VUE, thereby reducing or eliminating interference from in-band emission, and an existing resource selection manner is not altered. However, a problem of low resource utilization or uneven load may be caused.

FIG. 10 is a schematic structural diagram of Embodiment 1 of a first terminal according to the present invention. The first terminal provided in this embodiment may implement steps of a method that is applied to the first terminal and that is provided in any embodiment of the present invention. Specifically, the first terminal provided in this embodiment includes:

a processing module 11, configured to set first information, where the first information indicates a terminal type of the first terminal; and a sending module 12, configured to send a signal including the first information to a second terminal.

The first terminal provided in this embodiment of the present invention sets the first information indicating the terminal type of the first terminal, and sends the signal including the first information to the second terminal, so that the second terminal identifies the terminal type of the first terminal based on the first information. In this process, the first information is set, and the signal including the first information is sent to the second terminal, so that the second terminal identifies the terminal type of the first terminal based on the first information and processes the processed signal based on the terminal type of the first terminal, to prevent, by distinguishing types of terminals, signal interference from being caused between different terminals.

Optionally, in an embodiment of the present invention, the first information is specifically a type field of control information;

the processing module 11 is specifically configured to set the type field based on the terminal type of the first terminal; and the sending module 12 is specifically configured to send a signal including the control information.

Optionally, in an embodiment of the present invention, the first information is specifically a signal period field of control information;

the processing module 11 is specifically configured to set the signal period field based on the terminal type of the first terminal; and the sending module 12 is specifically configured to send a signal including the control information.

Optionally, in an embodiment of the present invention, the first information is specifically a transmit power field of control information;

the processing module 11 is specifically configured to set the transmit power field based on the terminal type of the first terminal; and the sending module 12 is specifically configured to send a signal including the control information.

Optionally, in an embodiment of the present invention, the first information is specifically a priority field of control information;

the processing module 11 is specifically configured to set the priority field based on the terminal type of the first terminal; and the sending module 12 is specifically configured to send a signal including the control information.

Optionally, in an embodiment of the present invention, the first information is specifically a sequence number of a demodulation reference signal DMRS;

the processing module 11 is specifically configured to set the sequence number based on the terminal type of the first terminal; and the sending module 12 is specifically configured to send a signal including the DMRS corresponding to the sequence number.

Optionally, in an embodiment of the present invention, the first information is specifically a mask of a demodulation reference signal DMRS;

the processing module 11 is specifically configured to set the mask of the DMRS based on the terminal type of the first terminal; and the sending module 12 is specifically configured to send a signal including the DMRS processed by using the mask.

Optionally, in an embodiment of the present invention, the first information is specifically an information element IE of Media Access Control MAC information;

the processing module 11 is specifically configured to set the IE based on the terminal type of the first terminal; and the sending module 12 is specifically configured to send a signal including the MAC information.

Optionally, in an embodiment of the present invention, the processing module 11 is further configured to: before the sending module 12 sends the signal including the first information, determine a transmission resource based on the terminal type of the first terminal; and the sending module 12 is specifically configured to send, by using the transmission resource, the signal including the first information.

Optionally, in an embodiment of the present invention, when the terminal type indicates that the first terminal is pedestrian user equipment PUE, the transmission resource includes a reusable resource, and the reusable resource is a resource, of another PUE, reused by the first terminal.

Optionally, in an embodiment of the present invention, the processing module 11 is further configured to: when the terminal type indicates that the first terminal is vehicle user equipment VUE, determine whether the first terminal can reuse a resource of PUE, and if the first terminal can reuse the resource of the PUE, the transmission resource includes a reusable resource, and the reusable resource is the resource, of the PUE, reused by the first terminal.

Optionally, in an embodiment of the present invention, the processing module 11 specifically determines whether the first terminal can reuse the resource of the PUE in at least one of the following manners:

determining whether energy of a signal received by the first terminal is less than a first threshold, and if the energy of the signal received by the first terminal is less than the first threshold, determining that the first terminal can reuse the resource of the PUE;

determining whether power of a signal received by the first terminal is less than a second threshold, and if the power of the signal received by the first terminal is less than the second threshold, determining that the first terminal can reuse the resource of the PUE; and determining whether power of a signal transmitted by the first terminal is less than a third threshold, and if the power of the signal transmitted by the first terminal is less than the third threshold, determining that the first terminal can reuse the resource of the PUE.

Optionally, in an embodiment of the present invention, the processing module 11 is specifically configured to determine, based on configuration information or preconfiguration information sent by a network side device, whether the first terminal can reuse the resource of the PUE.

FIG. 11 is a schematic structural diagram of Embodiment 1 of a second terminal according to the present invention. The second terminal provided in this embodiment may implement steps of a method that is applied to the second terminal and that is provided in any embodiment of the present invention. Specifically, the second terminal provided in this embodiment includes:

a receiving module 21, configured to receive a signal that includes first information and that is sent by a first terminal, where the first information indicates a terminal type of the first terminal; and a processing module 22, configured to identify the terminal type of the first terminal based on the first information.

The second terminal provided in this embodiment of the present invention receives a signal that includes first information and that is sent by a first terminal, where the first information indicates a terminal type of the first terminal; and identifies the terminal type of the first terminal based on the first information. In this process, the first terminal sets the first information, and sends the signal including the first information to the second terminal, so that the second terminal identifies the terminal type of the first terminal based on the first information and processes the processed signal based on the terminal type of the first terminal, to prevent, by distinguishing types of terminals, signal interference from being caused between different terminals.

Optionally, in an embodiment of the present invention, the first information is specifically a type field of control information;

the receiving module 21 is specifically configured to receive a signal including the control information, where the signal including the control information is obtained by setting, by the first terminal, the type field; and the processing module 22 is specifically configured to identify the terminal type of the first terminal based on the type field.

Optionally, in an embodiment of the present invention, the first information is specifically a signal period field of control information;

the receiving module 21 is specifically configured to receive a signal including the control information, where the signal including the control information is obtained by setting, by the first terminal, the signal period field; and the processing module 22 is specifically configured to identify the terminal type of the first terminal based on the signal period field.

Optionally, in an embodiment of the present invention, the first information is specifically a transmit power field of control information;

the receiving module 21 is specifically configured to receive a signal including the control information, where the signal including the control information is obtained by setting, by the first terminal, the transmit power field; and the processing module 22 is specifically configured to identify the terminal type of the first terminal based on the transmit power field.

Optionally, in an embodiment of the present invention, the first information is specifically a priority field of control information;

the receiving module 21 is specifically configured to receive a signal including the control information, where the signal including the control information is obtained by setting, by the first terminal, the priority field; and the processing module 22 is specifically configured to identify the terminal type of the first terminal based on the priority field.

Optionally, in an embodiment of the present invention, the first information is specifically a sequence number of a demodulation reference signal DMRS;

the receiving module 21 is specifically configured to receive a signal including the DMRAS corresponding to the sequence number, where the sequence number is set by the first terminal based on the terminal type of the first terminal; and the processing module 22 is specifically configured to identify the terminal type of the first terminal based on the sequence number.

Optionally, in an embodiment of the present invention, the first information is specifically a mask of a demodulation reference signal DMRS;

the receiving module 21 is specifically configured to receive a signal including the DMRS processed by using the mask, where the mask is set by the first terminal based on the terminal type of the first terminal; and the processing module 22 is specifically configured to identify the terminal type of the first terminal based on the mask.

Optionally, in an embodiment of the present invention, the first information is specifically an information element IE of Media Access Control MAC information;

the receiving module 21 is specifically configured to receive a signal including the MAC, where the signal including the MAC is obtained by setting, by the first terminal, the IE; and the processing module 22 is specifically configured to identify the terminal type of the first terminal based on the IE.

Optionally, in an embodiment of the present invention, the receiving module 21 is specifically configured to receive, by using a transmission resource, the signal that includes the first information and that is sent by the first terminal, where the transmission resource is determined by the first terminal based on the terminal type of the first terminal.

Optionally, in an embodiment of the present invention, when the terminal type indicates that the first terminal is pedestrian user equipment PUE, the transmission resource includes a reusable resource, and the reusable resource is a resource, of another PUE, reused by the first terminal.

Optionally, in an embodiment of the present invention, when the terminal type indicates that the first terminal is vehicle user equipment VUE, if the first terminal determines that the first terminal reuses a resource of PUE, the transmission resource includes a reusable resource, and the reusable resource is the resource, of the PUE, reused by the first terminal.

FIG. 12 is a schematic structural diagram of Embodiment 1 of a third terminal according to the present invention. The third terminal provided in this embodiment may implement steps of a method that is applied to the third terminal and that is provided in any embodiment of the present invention. Specifically, the third terminal provided in this embodiment includes:

a processing module 31, configured to select a first transmission resource based on a terminal type and/or a service type of the third terminal; and a sending module 32, configured to send a first signal to a fourth terminal by using the first transmission resource.

After selecting a first transmission resource based on a terminal type and/or a service type of the third terminal, the third terminal provided in this embodiment of the present invention sends a first signal to a fourth terminal by using the first transmission resource, and the fourth terminal processes the first signal and determines the terminal type of the third terminal based on the transmission resource. In this process, the third terminal selects the first transmission resource based on the terminal type and/or the service type of the third terminal, so that transmission resources selected by terminals of different terminal types are different, to prevent interference from being caused between signals sent by the terminals of the different terminal types; and similarly, the third terminal may alternatively select corresponding resources based on different service types, to prevent interference from being caused between services of the different service types.

Referring to FIG. 12 again, optionally, in an embodiment of the present invention, the third terminal is vehicle user equipment VUE, and the terminal further includes:

a receiving module 33, configured to receive a second signal sent by the forth terminal by using a second transmission resource; and the processing module 31 is specifically configured to select a first resource not conflicting with the second transmission resource based on the terminal type and/or the service type of the third terminal.

Optionally, in an embodiment of the present invention, the third terminal is pedestrian user equipment PUE, and the processing module 31 is specifically configured to:

select an SCI resource at a preset location;

select an SCI resource and a data resource that satisfy a preset mapping relationship; or select an SCI resource in a preset SCI resource pool and a data resource in a preset data resource pool.

FIG. 13 is a schematic structural diagram of Embodiment 1 of a fourth terminal according to the present invention. The fourth terminal provided in this embodiment may implement steps of a method that is applied to the fourth terminal and that is provided in any embodiment of the present invention. Specifically, the fourth terminal provided in this embodiment includes:

a receiving module 41, configured to receive a first signal sent by a third terminal by using a first transmission resource; and a processing module 42, configured to process the first signal.

The fourth terminal provided in this embodiment of the present invention receives a first signal sent by a third terminal by using a first transmission resource and processes the first signal, and because the first transmission resource is selected by the third terminal based on a terminal type and/or a service type of the third terminal, transmission resources selected by terminals of different terminal types are different, to prevent interference from being caused between signals sent by the terminals of the different terminal types; and similarly, the fourth terminal may alternatively select corresponding resources based on different service types, to prevent interference from being caused between services of the different service types.

Optionally, in an embodiment of the present invention, the processing module 42 is further configured to determine a terminal type of the third terminal based on the transmission resource.

Optionally, in an embodiment of the present invention, the processing module 42 is specifically configured to determine whether an SCI resource is located at a preset location, and if it is determined that the SCI resource is located at the preset location, determine that the third terminal is PUE; otherwise, determine that the third terminal is VUE.

Optionally, in an embodiment of the present invention, the processing module 42 is specifically configured to determine whether an SCI resource and a data resource satisfy a preset mapping relationship; and if it is determined that the SCI resource and the data resource satisfy the preset mapping relationship, determine that the third terminal is PUE; otherwise, determine that the third terminal is VUE.

Optionally, in an embodiment of the present invention, the processing module 42 is specifically configured to determine whether an SCI resource is located in a preset SCI resource pool and whether a data resource is located in a preset data resource pool; and if it is determined that the SCI resource is located in the preset SCI resource pool and the data resource is located in the preset data resource pool, determine that the third terminal is PUE; otherwise, determine that the third terminal is VUE.

FIG. 14 is a schematic structural diagram of Embodiment 2 of a first terminal according to the present invention. The first ten provided in this embodiment includes: a processor 51, a memory 52, a communications interface 53, and a system bus 54, where the memory 52 and the communications interface 53 are connected to the processor 51 by using the system bus 54 and complete communication between each other, the memory 52 is configured to store a computer executable instruction, the communications interface 53 is configured to communicate with another device, and the processor 51 is configured to run the computer executable instruction, to enable the first terminal to perform steps of the foregoing method applied to the first terminal.

FIG. 15 is a schematic structural diagram of Embodiment 2 of a second terminal according to the present invention. The second terminal provided in this embodiment includes: a processor 61, a memory 62, a communications interface 63, and a system bus 64, where the memory 62 and the communications interface 63 are connected to the processor 61 by using the system bus 64 and complete communication between each other, the memory 62 is configured to store a computer executable instruction, the communications interface 63 is configured to communicate with another device, and the processor 61 is configured to run the computer executable instruction, to enable the second terminal to perform steps of the foregoing method applied to the second terminal.

FIG. 16 is a schematic structural diagram of Embodiment 2 of a third terminal according to the present invention. The third terminal provided in this embodiment includes: a processor 71, a memory 72, a communications interface 73, and a system bus 74, where the memory 72 and the communications interface 73 are connected to the processor 71 by using the system bus 74 and complete communication between each other, the memory 72 is configured to store a computer executable instruction, the communications interface 73 is configured to communicate with another device, and the processor 71 is configured to run the computer executable instruction, to enable the third terminal to perform steps of the foregoing method applied to the fourth terminal.

FIG. 17 is a schematic structural diagram of Embodiment 2 of a fourth terminal according to the present invention. The fourth terminal provided in this embodiment includes: a processor 81, a memory 82, a communications interface 83, and a system bus 84, where the memory 82 and the communications interface 83 are connected to the processor 81 by using the system bus 84 and complete communication between each other, the memory 82 is configured to store a computer executable instruction, the communications interface 83 is configured to communicate with another device, and the processor 81 is configured to run the computer executable instruction, to enable the fourth terminal to perform steps of the foregoing method applied to the fourth terminal.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A first terminal, comprising:
    a system bus;
    a memory coupled to the system bus and configured to store a computer executable instruction;
    a communications interface coupled to the system bus and configured to communicate with another device; and
    a processor coupled to the system bus and configured to run the computer executable instruction to enable the first terminal to:
        set first information, wherein the first information indicates a terminal type of the first terminal, and wherein the first information comprises:
            a four-bit mask of a demodulation reference signal (DMRS);
            an information element (IE) of Media Access Control (MAC) information;
            a signal period field of the control information;
            a transmit power field of the control information; and
            a priority field of the control information;
        determine a transmission resource based on the terminal type of the first terminal;
        send, using the communications interface, and the transmission resource, a signal comprising the first information to a second terminal; and
        avoid signal interference between the first terminal and the second terminal.

2. The first terminal of claim 1, wherein the terminal type indicates that the first terminal is a pedestrian user equipment (PUE), wherein the transmission resource comprises a reusable resource, and wherein the reusable resource is a resource of another PUE reused by the first terminal.

3. The first terminal of claim 1, wherein the terminal type indicates that the first terminal is a vehicle user equipment (VUE), wherein the processor is further configured to run the computer executable instruction to enable the first terminal to determine whether the first terminal is configured to reuse a resource of a pedestrian user equipment (PUE), wherein the transmission resource comprises a reusable resource when the first terminal is configured to reuse the resource of the PUE, and wherein the reusable resource is the resource of the PUE reused by the first terminal.

4. The first terminal of claim 3, wherein in a manner of determining whether the first terminal is configured to reuse the resource of the PUE, the processor is further configured to run the computer executable instruction to enable the first terminal to:
    determine whether energy of a signal received is less than a first threshold; and
    determine that the first terminal is configured to reuse the resource of the PUE when the energy of the signal received is less than the first threshold.

5. The first terminal of claim 3, wherein in a manner of determining whether the first terminal is configured to reuse the resource of the PUE, the processor is further configured to run the computer executable instruction to enable the first terminal to:
    determine whether a power of a signal received is less than a second threshold; and
    determine that the first terminal is configured to reuse the resource of the PUE when the power of the signal received is less than the second threshold.

6. The first terminal of claim 3, wherein in a manner of determining whether the first terminal is configured to reuse the resource of the PUE, the processor is further configured to run the computer executable instruction to enable the first terminal to:
    determine whether a power of the signal transmitted by the first terminal is less than a third threshold; and
    determine that the first terminal is configured to reuse the resource of the PUE when the power of the signal transmitted by the first terminal is less than the third threshold.

7. The first terminal of claim 3, wherein in a manner of determining whether the first terminal is configured to reuse the resource of the PUE, the processor is further configured to run the computer executable instruction to enable the first terminal to determine, based on configuration information received from a network side device, whether the first terminal is configured to reuse the resource of the PUE.

8. The first terminal of claim 3, wherein in a manner of determining whether the first terminal is configured to reuse the resource of the PUE, the processor is further configured to run the computer executable instruction to enable the first terminal to determine, based on preconfiguration information received from a network side device, whether the first terminal is configured to reuse the resource of the PUE.

9. The first terminal of claim 1, wherein the transmission resource is a Sidelink Control Information (SCI) resource.

10. The first terminal of claim 9, wherein in a manner of identifying the terminal type of the second terminal, the processor is further configured to run the computer executable instruction to enable the first terminal to:
    determine whether the Sidelink Control Information (SCI) resource and a data resource satisfy a preset mapping relationship;
    identify that the second terminal is a pedestrian user equipment (PUE) when the SCI resource and the data resource satisfy the preset mapping relationship; and
    identify that the second terminal is a vehicle user equipment (VUE) when the SCI resource and the data resource do not satisfy the preset mapping relationship.

11. A first terminal, comprising:
    a system bus;
    a memory coupled to the system bus and configured to store a computer executable instruction;

a communications interface coupled to the system bus and configured to communicate with another device;
a processor coupled to the system bus and configured to run the computer executable instruction to enable the first terminal to:
receive, using the communications interface, a signal comprising first information from a second terminal, wherein the first information indicates a terminal type of the second terminal, and wherein the first information comprises:
 a four-bit mask of a demodulation reference signal (DMRS); and
 an information element (IE) of Media Access Control (MAC) information;
 a signal period field of the control information;
 a transmit power field of the control information; and
 a priority field of the control information;
receive, using a transmission resource, the signal comprising the first information from the second terminal, wherein the second terminal is configured to determine the transmission resource based on the terminal type of the second terminal;
identify the terminal type of the second terminal based on the first information; and
avoid signal interference between the first terminal and the second terminal.

12. The first terminal of claim 11, wherein the terminal type indicates that the second terminal is a pedestrian user equipment (PUE), wherein the transmission resource comprises a reusable resource, and wherein the reusable resource is a resource of another PUE reused by the second terminal.

13. The first terminal of claim 11, wherein the terminal type indicates that the second terminal is a vehicle user equipment (VUE), wherein the transmission resource comprises a reusable resource when the second terminal reuses a resource of a pedestrian user equipment (PUE), and wherein the reusable resource is the resource of the PUE reused by the second terminal.

14. A first terminal, comprising:
a system bus;
a memory coupled to the system bus and configured to store a computer executable instruction;
a communications interface coupled to the system bus and configured to communicate with another device; and
a processor coupled to the system bus and configured to run the computer executable instruction to enable the first terminal to:
receive a signal from a second terminal using a transmission resource;
process the signal, wherein processing the signal comprises determining a signal period, a signal transmit power, a signal priority information, a four- bit mask of a demodulation reference signal (DMRS), and an information element (IE) of Media Access Control (MAC) information;
identify a terminal type of the second terminal based on the transmission resource;
and avoid signal interference between the first terminal and the second terminal, wherein the first terminal comprises vehicle user equipment (VUE) and the second terminal comprises pedestrian user equipment (PUE).

15. The first terminal of claim 14, wherein in a manner of identifying the terminal type of the second terminal, the processor is further configured to run the computer executable instruction to enable the first terminal to:
determine whether a Sidelink Control Information (SCI) resource is located at a preset location;
identify that the second terminal is a pedestrian user equipment (PUE) when the SCI resource is located at the preset location; and
identify that the second terminal is a vehicle user equipment (VUE) when the SCI resource is not located at the preset location.

16. The first terminal of claim 14, wherein in a manner of identifying the terminal type of the second terminal, the processor is further configured to run the computer executable instruction to enable the first terminal to:
determine whether a Sidelink Control Information (SCI) resource and a data resource satisfy a preset mapping relationship;
identify that the second terminal is a pedestrian user equipment (PUE) when the SCI resource and the data resource satisfy the preset mapping relationship; and
identify that the second terminal is a vehicle user equipment (VUE) when the SCI resource and the data resource do not satisfy the preset mapping relationship.

17. The first terminal of claim 16, wherein the transmission resource is a Sidelink Control Information (SCI) resource.

18. The first terminal of claim 16, wherein the terminal type of the second terminal is a pedestrian user equipment (PUE).

19. The first terminal of claim 16, wherein the terminal type of the second terminal is a vehicle user equipment (VUE).

20. The first terminal of claim 14, wherein in a manner of identifying the terminal type of the second terminal, the processor is further configured to run the computer executable instruction to enable the first terminal to:
determine whether a Sidelink Control Information (SCI) resource is located in a preset SCI resource pool and a data resource is located in a preset data resource pool;
determine that the second terminal is a pedestrian user equipment (PUE) when the SCI resource is located in the preset SCI resource pool and the data resource is located in the preset data resource pool; and
identify that the second terminal is a vehicle user equipment (VUE) when the SCI resource is not located in the preset SCI resource pool and the data resource is not located in the preset data resource pool.

* * * * *

UNITED STATES PATENT AND TRADEMARK OFFICE
CERTIFICATE OF CORRECTION

PATENT NO. : 11,184,951 B2
APPLICATION NO. : 16/325094
DATED : November 23, 2021
INVENTOR(S) : Yongbo Zeng, Yu Cai and Jian Wang Page 1 of 1

It is certified that error appears in the above-identified patent and that said Letters Patent is hereby corrected as shown below:

On the Title Page

Item [57], Line 3: "signal including, the first" should read "signal including the first"

Page 2, item [56]: "GN 103262632 A 8/2013" should read "CN 103262632 A 8/2013"

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*